(12) United States Patent
Shelepin et al.

(10) Patent No.: US 6,509,999 B1
(45) Date of Patent: Jan. 21, 2003

(54) ELECTROCHROMIC DEVICE HAVING IMPROVED SWITCHING BEHAVIOR

(75) Inventors: Igor Shelepin, Dolgoprudny (RU); Vladimir Gavrilov, Dolgoprudny (RU); Horst Berneth, Leverkusen (DE); Wolfgang Jacobsen, Köln (DE); Ralf Neigl, Yorktown Heights, NY (US)

(73) Assignee: Bayer Aktiengesellschaft, Leverkusen (DE)

( * ) Notice: Subject to any disclaimer, the term of this patent is extended or adjusted under 35 U.S.C. 154(b) by 63 days.

(21) Appl. No.: 09/718,577

(22) Filed: Nov. 22, 2000

(30) Foreign Application Priority Data

Nov. 23, 1999 (DE) ............................................ 19956228

(51) Int. Cl.⁷ ................................................ G02L 1/01

(52) U.S. Cl. ...................................... 359/265; 359/272

(58) Field of Search ................................. 359/265, 266, 359/267, 268, 272, 273, 274, 275

(56) References Cited

U.S. PATENT DOCUMENTS

| | | | | |
|---|---|---|---|---|
| 3,280,701 | A | 10/1966 | Donnelly et al. | 88/77 |
| 4,465,341 | A * | 8/1984 | Nanya et al. | 350/357 |
| 4,902,108 | A | 2/1990 | Byker | 350/357 |
| 4,983,957 | A * | 1/1991 | Ishikawa et al. | 340/785 |
| 5,140,455 | A | 8/1992 | Varaprasad et al. | 359/275 |
| 5,151,816 | A | 9/1992 | Varaprasad et al. | 359/275 |
| 5,457,564 | A | 10/1995 | Leventis et al. | 359/271 |
| 5,818,636 | A | 10/1998 | Leventis et al. | 359/273 |
| 6,020,987 | A | 2/2000 | Baumann et al. | 359/273 |
| 6,241,916 | B1 * | 6/2001 | Claussen et al. | 252/583 |

FOREIGN PATENT DOCUMENTS

| | | |
|---|---|---|
| DE | 196 31 728 | 2/1998 |
| WO | 97/30134 | 8/1997 |

OTHER PUBLICATIONS

D. Thesis in Ullmann's Encyclopaedia of Industrial Chemistry, vol. A8, (month unavailable), 1987, pp. 622–623, "Electrochemical Displays".

Elektrokhimiya, vol. 13, (month unavailable), 1977, pp. 32–37, H. B. Illeaunuh et al.

(List continued on next page.)

Primary Examiner—Georgia Epps
Assistant Examiner—Richard Hanig
(74) Attorney, Agent, or Firm—Godfried R. Akorli; Diderico van Eyl; Noland J. Cheung

(57) ABSTRACT

An electrochromic device comprising a pair of glass or plastic plates or plastic films of which at least one plate or film, preferably both plates or films, are provided on in each case one side with an electrically conductive coating, of which at least one plate or film and its conductive coating is transparent, of which the other may be mirrored, and of which in the case of at least one of the two plates or films the electrically conductive layer can be divided into separate, individually contacted area segments and the conductive coatings can be connected at at least one point to an electrical conductor, where the plates or films are joined together via a sealing ring on the sides of their conductive coating, and the volume formed by the two plates or films and the sealing ring is filled with an electrochromic medium which comprises at least one reducible electrochromic compound $OX_2$ and at least one oxidizable electrochromic compound $RED_1$, in which the electrochromic medium also comprises a further reducible or an oxidizable electrochromic compound $OX_3$ or $RED_3$ respectively whose reduction or oxidation potential respectively has a value which is not greater than the reduction potential of $OX_2$ or the oxidation potential of $RED_1$, is distinguished by improved switching behavior.

9 Claims, 6 Drawing Sheets

OTHER PUBLICATIONS

Society of Dyers & Colorists (month unavailable) 1987, Chapter 3, Roderick McDonald Color Physics for Industry, pp. 63–96, B. Rigg, "Colorimetry and the CIE System".

Society of Dyers & Colorists (month unavailable) 1987, Chapter 5, Color Physics for Industry, pp. 116–185, Roderick McDonald, "Computer Match Prediction—Dyes".

Topics in Current Chemistry, vol. 92 (month unavailable), 1980, pp. 1–44, S. Hünig et al, "Two Step Reversible Redox System of the Weitz Type".

Agnew Chem., 90, (month unavailable), 1978, pp. 927–938, Von Klaus Deuchert et al, "Mehrstufige Organische Redoxsysteme–Ein Allgemeines Strukturprinzip".

* cited by examiner

ELECTROCHROMIC DEVICE HAVING IMPROVED SWITCHING BEHAVIOR

FIELD OF THE INVENTION

The present invention relates to an electrochromic device having improved switching behavior.

BACKGROUND OF THE INVENTION

Electrochromic devices are already known, for example, from D. Theis in Ullmann's Encyclopaedia of Industrial Chemistry, Vol. A 8, p. 622, Verlag Chemie 1987 and WO-A 94/23333. A distinction is made between two basic types:

Type 1: full-area electrochromic devices; and
Type 2: electrochromic display devices having structured electrodes.

Type 1 is used, for example, in electrically darkenable window panes or electrically dimmable automobile mirrors. Such devices are disclosed, for example, in U.S. Pat. No. 4,902,108. Type 2 is used in segment and matrix displays. Such display devices are proposed, for example, in DE-A 196 31 728. Devices of this type can be observed transmissively or, in the case of reflection, reflectively.

WO-A 94/23333 compares electrochromic materials having different constructions, but these are not used as display devices:

Construction a: the electrochromic substances are in the form of a fixed film or layer on the electrodes (cf. Ullmann, see above).

Construction b: the electrochromic substances are deposited on the electrodes as a layer by the redox process (cf. Ullmann, see above).

Construction c: the electrochromic substances remain permanently in solution.

For construction a), the best-known electrochromic material is the tungsten oxide/palladium hydride pair. For construction b), viologens have been described as electrochromic substances. These devices are not self-erasing, i.e., the image produced remains after the current has been switched off and can only be erased again by reversing the voltage. Such devices are not particularly stable and do not allow a large number of switching cycles.

In addition, the cells constructed using tungsten oxide/palladium hydride in particular cannot be operated in transmitted light, but only reflectively, owing to light scattering at these electrochromic layers.

Elektrokhimiya 13, 32–37 (1977), U.S. Pat. No. 4,902,108 and U.S. Pat. No. 5,140,455 disclose an electrochromic system of the latter construction c). An electrochromic cell built up from glass plates with a conductive coating contains a solution of a pair of electrochromic substances in an inert solvent.

The pair of electrochromic substances used is one electrochemically reversibly reducible substance and one reversibly oxidizable substance. Both substances are colorless or only weakly colored in the ground state. Under the action of an electric voltage, one substance is reduced and the other oxidized, both becoming colored. When the voltage is switched off, the ground state re-forms in the case of both substances, decolorization or a color lightening taking place.

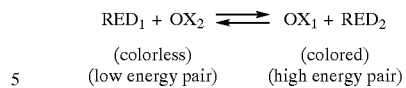

$$RED_1 + OX_2 \rightleftharpoons OX_1 + RED_2 \quad (Eq. 1)$$

(colorless) (colored)
(low energy pair) (high energy pair)

U.S. Pat. No. 4,902,108 discloses that suitable pairs of redox substances are those in which the reducible substance has at least two chemically reversible reduction waves in the cyclic voltammogram and the oxidizable substance correspondingly has at least two chemically reversible oxidation waves.

Various applications have been described for such electrochromic cells of construction c. For example, they can be formed as automobile rear-view mirrors which can be darkened during night driving by application of a voltage and thus prevent dazzling by the headlamps of following vehicles (cf. for example, U.S. Pat. Nos. 3,280,701, 4,902, 108 and EP-A 0 435 689). Furthermore, such cells can also be used in window panes or automobile sunroofs, where they darken the sunlight after application of a voltage. Likewise described is the use of such devices as electrochromic display devices, for example, in segment or matrix displays having structured electrodes (DE-A 196 31 728).

The electrochromic cells normally consist of a pair of glass plates, of which, in the case of the automobile mirror, one is mirrored. One side of these plates is coated over the full area with a light-transparent, electroconductive layer, for example indium-tin oxide (ITO), where, in the case of display devices, this conductive coating is divided into electrically separated segments provided with individual contacts. These plates are used to construct a cell by bonding them by means of a sealing ring with their electroconductively coated sides facing one another to form a cell. This cell is filled with an electrochromic liquid via an opening, and the cell is tightly sealed. The two plates are connected to a voltage source via the ITO layers.

Electrochromic devices of construction c, as described in greater detail above, are self-extinguishing, i.e., the coloring of the device disappears of its own accord when the voltage is switched off. This can be accelerated, for example, by short-circuiting the poles of the device or by brief application of a voltage of opposite polarity. In accordance with the above-mentioned equation, the uncolored molecules $RED_1$ and $OX_2$ then re-form through electron transfer from the colored molecules $OX_1$ and $RED_2$.

However, this self-extinguishing may be considerably slowed, in particular in the case of display devices in which the electrically conductive coating on at least one of the two plates or films is divided into individually contacted segments, in particular if voltage was applied to individual segments for an extended period.

Surprisingly, it has now been found that the self-extinguishing of an electrochromic device, particularly an electrochromic display device, can be considerably accelerated if the electrochromic medium, in addition to the electrochromic substances $OX_2$ and $RED_1$, also contains a further reducible or oxidizable electrochromic compound $OX_3$ or $RED_3$ respectively whose reduction or oxidation potential respectively has a value which is not greater than the reduction potential of $OX_2$ or the oxidation potential of $RED_1$.

It has been found that a further advantage of an electrochromic device of this type which contains an $OX_3$ or $RED_3$ in addition to $OX_2$ and $RED_1$ is that the edge sharpness of the switched segments of an electrochromic display device is significantly increased.

SUMMARY OF THE INVENTION

The invention relates to an electrochromic device that comprises a pair of glass plates, a pair of plastic plates, or a pair of plastic films, and an electrically conductive coating located on a side of at least one of the glass plates, the plastic plates, or the plastic films. The pair of glass plates, plastic plates or plastic films are joined together via a sealing ring located on the side in which the electrically conductive coating is located such that the pair of glass plates, plastic plates, or plastic films and the sealing ring form a volume. The term "volume" herein is interchangeable with the term cavity.

The invention provides an electrochromic medium that is contained in the volume that comprises (i) a first reducible electrochromic compound and a second reducible electrochromic compound having a reduction potential that is less than the reduction potential of the first reducible electrochromic compound, and (ii) a first oxidizable compound and a second oxidizable compound having an oxidation potential that is less than the oxidation potential of the first oxidizable compound in which at least one plate or at least one film and the conductive coating is transparent, such that the electrically conductive coating in at least one of the plastic plates, the glass plates, or the two films can be divided into separate, individually contacted area segments and the conductive coatings can be connected at at least one point to an electrical conductor. The invention is also directed to an electrochromic medium.

DESCRIPTION OF THE FIGURES

These and other features, aspects, and advantages of the present invention will become better understood with reference to the following description and appended claims, where

DESCRIPTION OF THE INVENTION

Figure 1:
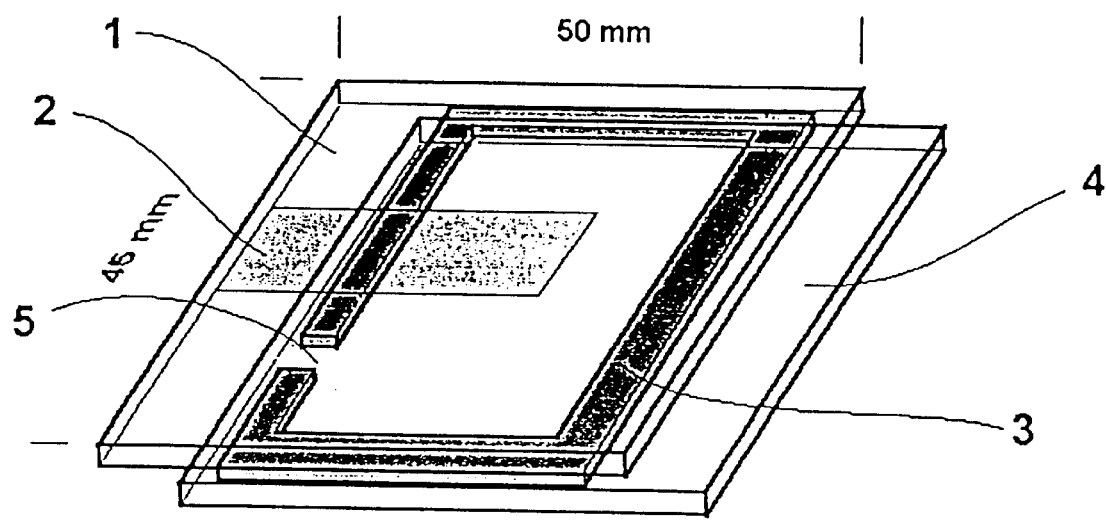
FIG. 1 shows a diagram of a structured electrochromic cell.

The invention accordingly relates to an electrochromic device that comprises a pair of glass plates or plastic plates or plastic films. At least one plate or film, preferably both plates or films, are provided on in each case one side with an electrically conductive coating, of which at least one plate or film and its conductive coating is transparent, of which the other may be mirrored, and of which in the case of at least one of the two plates or films the electrically conductive layer can be divided into separate, individually contacted area segments and the conductive coatings can be connected at at least one point to an electrical conductor. The plates or films are joined together via a sealing ring on the sides of their conductive coating, and the volume formed by the two plates or films and the sealing ring is filled with an electrochromic medium which comprises at least one reducible electrochromic compound $OX_2$ and at least one oxidizable electrochromic compound $RED_1$, characterized in that the electrochromic medium also comprises a further reducible or oxidizable electrochromic compound $OX_3$ or $RED_3$, respectively, whose reduction or oxidation potential respectively has a value which is not greater than the reduction potential of $OX_2$ or the oxidation potential of $RED_1$.

The invention also relates to an electrochromic medium including at least one reducible electrochromic compound $OX_2$ and at least one oxidizable electrochromic compound $RED_1$ and in addition a further reducible or oxidizable electrochromic compound $OX_3$ or $RED_3$ whose reduction or oxidation potential has a value which is not greater than the reduction potential of $OX_2$ or the oxidation potential of $RED_1$. The choice of $OX_3$ or $RED_3$ is in principle not restricted apart from the fact that the electrochemical conversion

$$OX_3 \rightleftharpoons RED_3 \qquad (Eq.\ 2)$$

takes place reversibly and is not accompanied by any subsequent chemical or electrochemical steps, in particular of a reversible nature. In particular, the redox reactions between $OX_3$ and $RED_1$ or $RED_2$ or between $RED_3$ and $OX_2$ or $OX_1$ must not have any irreversible components.

In a preferred form of the electrochromic device according to the invention, the $OX_3$ compound used is chemically and electrochemically identical to the $OX_1$ compound that corresponds to the $RED_1$ compound. That is, the $OX_3$ compound is the same as the $OX_1$ compound. In another preferred form of the electrochromic device according to the invention, the $RED_3$ compound used is chemically and electrochemically identical to the $RED_2$ that corresponds to the $OX_2$ compound. That is, the $RED_3$ compound is the same as the $RED_2$ compound.

Preference is likewise given to electrochromic devices according to the invention in which $OX_3$ and $RED_3$ only absorb weakly, or if possible not at all, in the visible part of the electromagnetic spectrum.

For the purposes of the invention, preference is given to electrochromic devices having improved switching behavior in which a) the reducible substance has at least one, preferably at least two, chemically reversible reduction waves in the cyclic voltammogram and the oxidizable substance correspondingly has at least one, preferably at least two, chemically reversible oxidation waves, or b) the reducible substance and the oxidizable substance are covalently bonded to one another via a bridge B, or c) the reducible and/or oxidizable substances selected are those in which the reversible transition between the oxidizable form and the reducible form or vice versa is associated with the breaking or forming of an σ-bond, or d) the reducible substance and/or the oxidizable substance are metal salts or metal complexes of metals which exist in at least two oxidation states, or e) the reducible and/or oxidizable substances are oligomers and polymers containing at least one of said redox systems, but also pairs of such redox systems as defined under a) to d), or f) the reducible and/or oxidizable substance used are mixtures of the substances described in a) to e), provided these mixtures contain at least one reducible and at least one oxidizable redox system.

The term reducible substance is taken to mean $OX_2$ and $OX_3$, and the term oxidizable substance is taken to mean $RED_1$ and $RED_3$.

The electrochromic device according to the invention contains $OX_2$ and $RED_1$ in the electrochromic medium in similar or the same concentrations. The concentrations generally differ by not more than a factor of 3, in particular 2, very particularly 1.1. The concentration of $OX_3$ or $RED_3$ in the electrochromic medium is, by contrast, <30%, preferably <20%, more preferably <10%, of the concentrations of $OX_2$ or $RED_1$. If the concentrations of $OX_2$ and $RED_1$ are not the same, the reference point is the concentration which is the lowest.

Through selection of the electrochromic compounds $RED_1$, $OX_2$ and $OX_3$ or $RED_3$ and/or mixtures thereof, any desired monochromic hues can be established. For a polychromic color display, two or more such electrochromic devices can be placed one on top of the other, with each of these devices being capable of producing a different hue. Such a stack is preferably built up in such a way that the devices in contact with one another have a common light-transparent plate, which is then provided with a conductive coating on both sides and, depending on the design, divided into segments. A stack then consists of, for example, of three electrochromic devices consisting of at least four plates. By switching on segments in various of these stacked devices, multicolored displays can be achieved. If consecutive segments in different devices of this kind are switched on, a subtractive color mixture is obtained. Thus, any desired colors can be displayed in the context of trichromicity, e.g., for example, colored images.

Suitable $OX_2$ and $RED_1$ for the purposes of the invention are substances which, on reduction or oxidation at the cathode or anode in the solvent mentioned, give products $RED_2$ and $OX_1$ which do not undergo any subsequent chemical reaction, but instead can be fully oxidized or reduced back to $OX_2$ and $RED_1$.

Through selection of the electrochromic compounds $RED_1$ and $OX_2$ and/or mixtures thereof, any desired monochromic hues can be set. The preferred grey shades can be set in a known manner by suitable mixing of trichromicity colors (Color Physics for Industry, Roderick McDonald, ed., Society of Dyers and Colorists, 1987, Chapters 3 and 5). Reference is also made here to WO-A 98/44384.

Suitable reducible substances $OX_2$ are, for example:

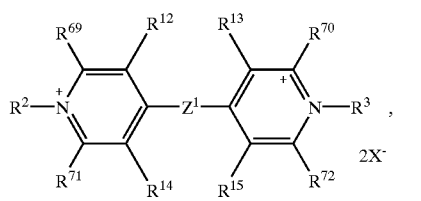
(I)

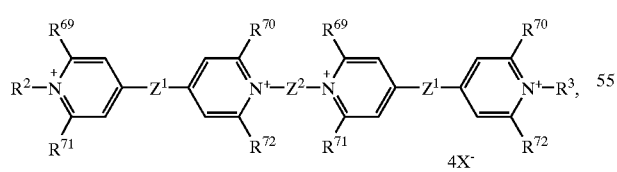
(II)

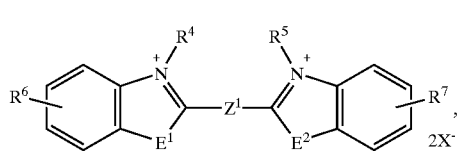
(III)

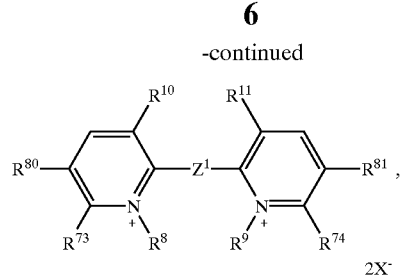
(IV)

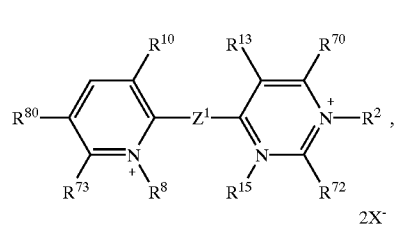
(V)

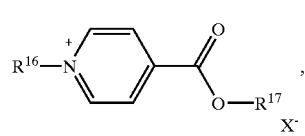
(VI)

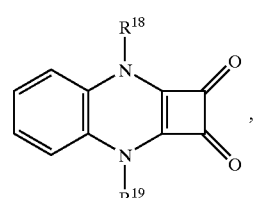
(VII)

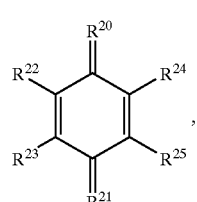
(VIII)

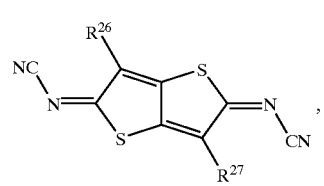
(IX)

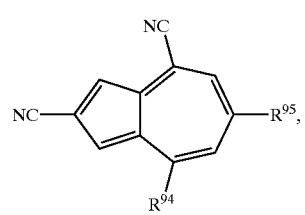
(X)

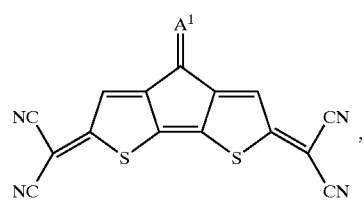
(XI)

-continued

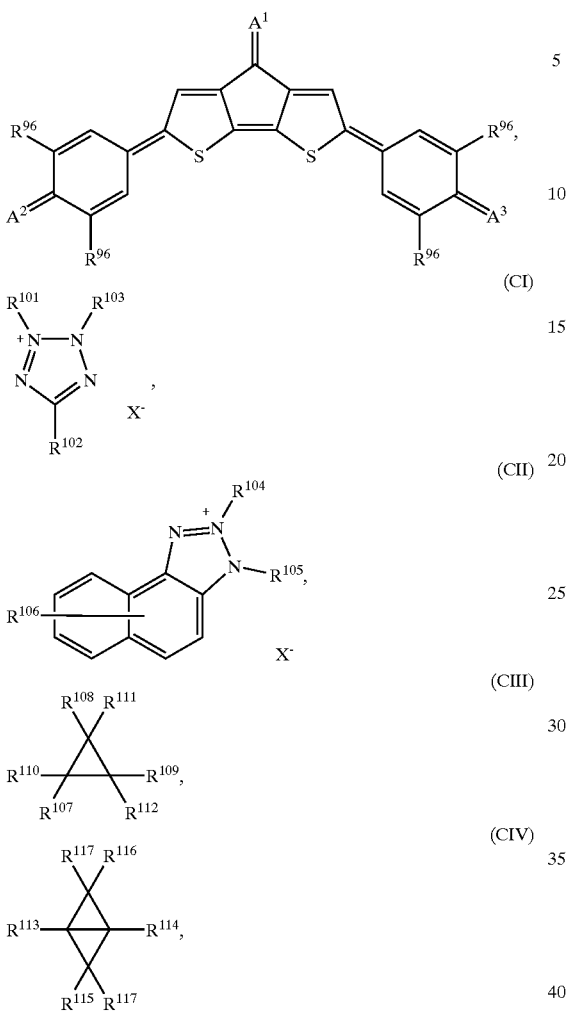

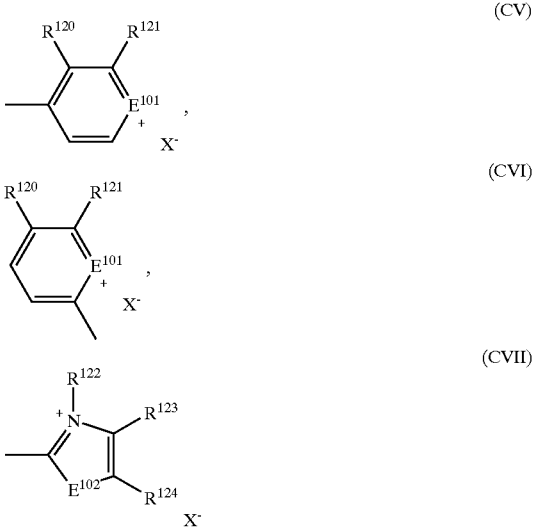

in which
- $R^2$ to $R^5$, $R^8$, $R^9$, $R^{16}$ to $R^{19}$, independently of one another, are selected from the following groups: $C_1$- to $C_{18}$-alkyl, $C_2C_7$-cycloalkyl, $C_7$- to $C_{15}$-aralkyl or $C_6$- to $C_{10}$-aryl, or $R^4$; $R^5$ or $R^8$; $R^9$ together can form a —(CH$_2$)$_2$— or —(CH$_2$)$_3$— bridge,
- $R^6$, $R^7$ and $R^{22}$ to $R^{25}$, independently of one another, are hydrogen, $C_1$- to $C_4$-alkyl, $C_1$- to $C_4$-alkoxy, halogen, cyano, nitro or $C_1$- to $C_4$-alkoxycarbonyl, or $R^{22}$; $R^{23}$ and/or $R^{24}$; $R^{25}$ can form a —CH=CH—CH=CH— bridge,
- $R^{10}$; $R^{11}$, $R^{10}$; $R^{13}$, $R^{12}$; $R^{13}$ and $R^{14}$; $R^{15}$, independently of one another, are hydrogen or in pairs are a —(CH$_2$)$_2$—, —(CH$_2$)$_3$— or —CH=CH— bridge,
- $R^{20}$ and $R^{21}$, independently of one another, are O, N—CN, C(CN)$_2$ or N—C$_6$— to C$_{10}$-aryl, $R^{26}$ and $R^{27}$ are hydrogen, $C_1$- to $C_4$-alkyl, $C_1$- to $C_4$-alkoxy, halogen, cyano, nitro, $C_1$- to $C_4$-alkoxycarbonyl or $C_6$- to $C_{10}$-aryl,
- $R^{69}$ to $R^{74}$, $R^{80}$ and $R^{81}$, independently of one another, are hydrogen or $C_1$- to $C_6$-alkyl, and
- $R^{69}$ to $R^{74}$, independently of one another, are additionally aryl, or $R^{69}$; $R^{12}$, $R^{70}$; $R^{13}$, $R^{73}$; $R^{80}$ and/or $R^{74}$; $R^{81}$ together form a —CH=CH—CH=CH— bridge,
- $E^1$ and $E^2$, independently of one another, are O, S, N$^1$ or C(CH$_3$)$_2$, or $E^1$ and $E^2$ together form a —N—(CH$_2$)$_2$—N— bridge, $R^1$ is $C_1$- to $C_{18}$-alkyl, $C_2$- to $C_{12}$-alkenyl, $C_4$- to $C_7$-cycloalkyl, $C_7$- to $C_{15}$-aralkyl, $C_6$- to $C_{10}$-aryl, $Z^1$ is a direct bond, —CH=CH—, —C(CH$_3$)=CH—, —C(CN)=CH—, —CCl=CCl—, —C(OH)=CH—, —CCl=CH—, —C≡C—, —CH=N—N=CH—, —C(CH$_3$)=N—N=C(CH$_3$)—, —CCl=N—N=CCl— or —C$_6$H$_4$—, $Z^2$ is —(CH$_2$)$_r$— or —CH$_2$—C$_6$H$_4$—CH$_2$—, r is an integer from 1 to 10,
- $R^{94}$ and $R^{95}$, independently of one another, are hydrogen or cyano,
- $R^{101}$ to $R^{105}$, independently of one another, are $C_6$- to $C_{10}$-aryl or an optionally benzo-fused aromatic or quasi-aromatic, five- or six-membered heterocyclic ring,
- $R^{107}$, $R^{109}$, $R^{113}$ and $R^{114}$, independently of one another, are a radical of the formulae (CV) to (CVII)

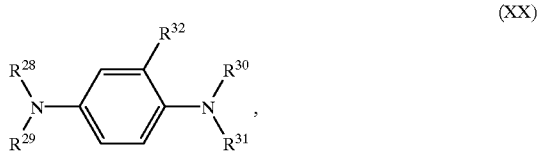

- $R^{108}$, $R^{115}$ and $R^{116}$, independently of one another, are $C_6$- to $C_{10}$-aryl or a radical of the formula (CV),
- $R^{110}$ to $R^{112}$, $R^{117}$ and $R^{118}$, independently of one another, are hydrogen, $C_1$- to $C_4$-alkyl, halogen or cyano, $E^{101}$ and $E^{102}$, independently of one another, are O, S or N—$R^{119}$, $R^{119}$ and $R^{122}$, independently of one another, are $C_1$- to $C_{18}$-alkyl, $C_2$- to $C_8$-alkenyl, $C_4$- to $C_7$-cycloalkyl, $C_7$- to $C_{15}$-aralkyl or $C_6$- to $C_{10}$-aryl,
- $R^{106}$, $R^{120}$, $R^{121}$, $R^{123}$ and $R^{124}$, independently of one another, are hydrogen, $C_1$- to $C_4$-alkyl, $C_1$- to $C_4$-alkoxy, halogen, cyano, nitro or $C_1$- to $C_4$-alkoxy carbonyl, or $R^{120}$, $R^{121}$ or $R^{123}$, $R^{124}$ together form a —CH=CH—CH=CH— bridge,
- $A^1$, $A^2$ and $A^3$, independently of one another, are O or C(CN)$_2$, $R^{96}$ is hydrogen, phenyl or tert-butyl, and
- X$^-$ is an anion which is redox-inert under the conditions.

Examples of suitable oxidizable substances RED$_1$ are the following:

(XX)

-continued

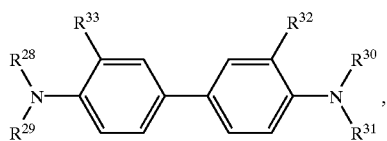
(XXI)

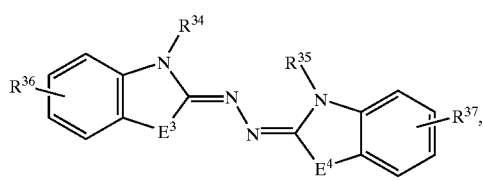
(XXII)

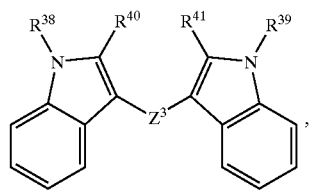
(XXIII)

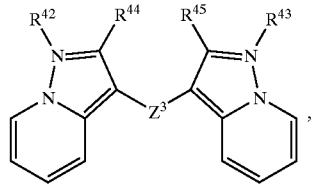
(XXIV)

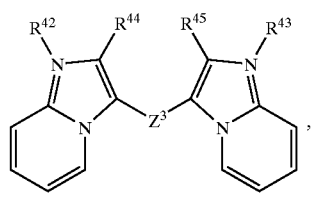
(XXV)

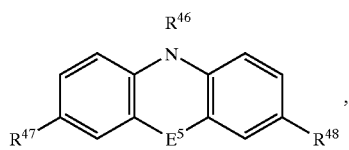
(XXVI)

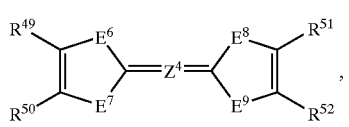
(XXVII)

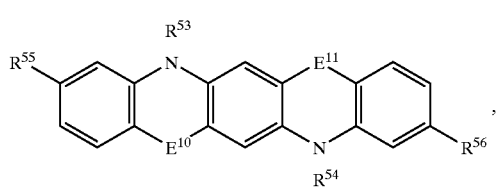
(XXVIII)

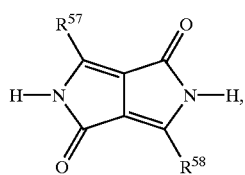
(XXIX)

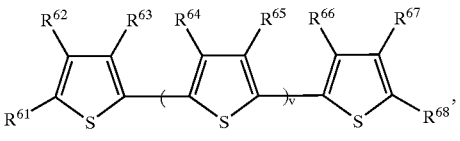
(XXX)

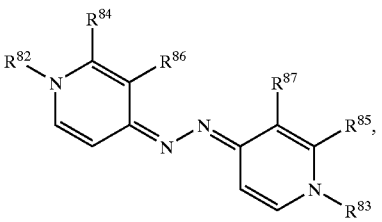
(XXXI)

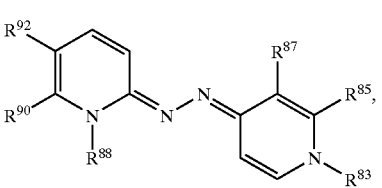
(XXXII)

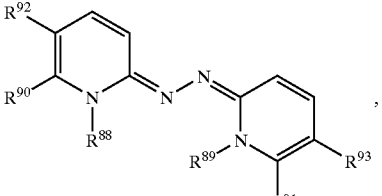
(XXXIII)

in which $R^{28}$ to $R^{31}$, $R^{34}$, $R^{35}$, $R^{38}$, $R^{39}$, $R^{46}$, $R^{53}$ and $R^{54}$, independently of one another, are selected from the following groups: $C_1$- to $C_{18}$-alkyl, $C_2$- to $C_{12}$-alkenyl, $C_4$- to $C_7$-cycloalkyl, $C_7$- to $C_{15}$-aralkyl or $C_6$- to $C_{10}$-aryl, $R^{32}$, $R^{33}$, $R^{36}$, $R^{37}$, $R^{40}$, $R^{41}$, $R^{42}$ to $R^{45}$, $R^{47}$, $R_{48}$, $R_{49}$ to $R^{52}$, $R^{55}$ to $R^{58}$ and $R^{97}$ to $R^{100}$, independently of one another, are selected from the following: hydrogen, $C_1$- to $C_4$-alkyl, $C_1$- to $C_4$-alkoxy, halogen, cyano, nitro, $C_1$- to $C_4$-alkoxycarbonyl, $C_6$- to $C_{10}$-aryl or $C_6$- to $C_{10}$-aryloxy, and $R^{57}$ and $R^{58}$ are additionally an aromatic or quasi-aromatic, five- or six-membered heterocyclic ring which is optionally benzo-fused, and $R^{48}$ is additionally $NR^{75}R^{76}$ or $R^{49}$; $R^{50}$; $R^{51}$; $R^{52}$ and/or $R^{48}$; $R^{99}$; $R^{97}$; $R^{98}$ or $R^{98}$;

$R^{100}$, independently of one another, form a —$(CH_2)_3$—, —$(CH_2)_4$—, —$(CH_2)_5$— or —CH=CH—CH=CH— bridge, $Z^3$ is a direct bond, a —CH=CH— or —N=N— bridge, =$Z^4$= is a direct double bond, a =CH—CH= or =N—N= bridge, $E^3$ to $E^5$, $E^{10}$ and $E^{11}$, independently of one another, are O, S, $NR^{59}$ or $C(CH_3)_2$, and $E^5$ is additionally C=O or $SO_2$, $E^3$ and $E^4$, independently of one another, can additionally be —CH=CH—, $E^6$ to $E^9$, independently of one another, are S, Se or $NR^{59}$, $R^{59}$, $R^{75}$ and $R^{76}$, independently of one another, are $C_1$- to $C_{12}$-alkyl, $C_2$- to $C_8$-alkenyl, $C_4$- to $C_7$-cycloalkyl, $C_7$- to $C_{15}$-aralkyl, $C_6$- to $C_{10}$-aryl, and R$^{75}$ is additionally hydrogen or R$^{75}$ and R$^{76}$ in the definition of NR$^{75}$R$^{76}$ are, together with the N atom to which they are bonded, a five- or six-membered ring, which optionally contains further heteroatoms, R$^{61}$ to R$^{68}$, independently of one another, are hydrogen, C$_1$- to C$_6$-alkyl, C$_1$- to C$_4$-alkoxy, cyano, C$_1$- to C$_4$-alkoxycarbonyl or C$_6$- to C$_{10}$-aryl, and R$^{61}$; R$^{62}$ and R$^{67}$; R$^{68}$, independently of one another, additionally form a —(CH$_2$)$_3$—, —(CH$_2$)$_4$— or —CH=CH—CH=CH— bridge, or R$^{62}$; R$^{63}$, R$^{64}$; R$^{65}$ and R$^{66}$; R$^{67}$ form an —O—CH$_2$CH$_2$—O— or —O—CH$_2$CH$_2$CH$_2$—O— bridge, v is an integer between 0 and 100, R$^{82}$, R$^{83}$, R$^{88}$ and R$^{89}$, independently of one another, are C$_1$- to C$_{18}$-alkyl, C$_2$- to C$_{12}$-alkenyl, C$_4$- to C$_7$-cycloalkyl, C$_7$- to C$_{15}$-aralkyl or C$_6$- to C$_{10}$-aryl, R$^{84}$ to R$^{87}$ and R$^{90}$ to R$^{93}$, independently of one another, are hydrogen or C$_1$- to C$_6$-alkyl, or R$^{84}$; R$^{86}$, R$^{85}$; R$^{87}$, R$^{90}$; R$^{92}$ and/or R$^{91}$; R$^{93}$ together form a —CH=CH—CH=CH— bridge.

Suitable as RED$_1$ are likewise anions, such as, for example, I$^-$, I$_3^-$, Br$^-$ and SCN$^-$.

Examples of optionally oligomeric or polymeric redox systems linked via a bridge B are those of the formula

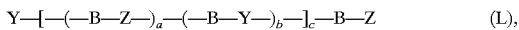  (L), in which

Y and Z, independently of one another, are a radical OX$_2$ or RED$_1$, in which OX$_2$ is the radical of a reversibly electrochemically reducible redox system, and RED$_1$ is the radical of a reversibly electrochemically oxidizable redox system, B is a bridging unit, c is an integer from 0 to 1000, and a and b, independently of one another, are an integer from 0 to 100.

(a+b)·c is preferably ≦10,000.

The term reversibly electrochemically reducible or oxidizable here is taken to mean that electron transfer can take place with or without a change in the σ-structure entirely within the sense of the above-mentioned definition of OX$_2$ and RED$_1$ according to the invention.

The electrochromic compounds of the formula (L) are in particular taken to mean oligomeric compounds of the formulae

  (La),

  (Lb),

  (Lc),

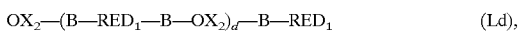  (Ld),

  (Le), or

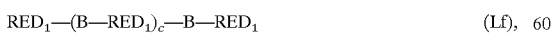  (Lf), in which

OX$_2$, RED$_1$ and B are as defined above, d is an integer from 1 to 5, and e is an integer from 0 to 5, where OX$_2$, RED$_1$ and/or B, in particular if d and/or e are >1, can have different meanings in each recurring unit.

The electrochromic compounds of the formula (L) are taken to mean, in particular, polymeric compounds of the formulae

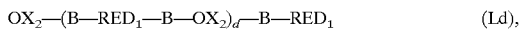  (Ld),

  (Le),

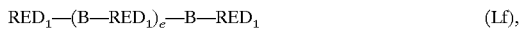  (Lf), in which

OX$_2$, RED$_1$ and B are as defined above, d is an integer from 5 to 100,000, preferably from 10 to 10,000, and e is an integer from 5 to 100,000, preferably from 10 to 10,000, where OX$_2$, RED$_1$ and/or B, in particular if d and/or e are >1, can have different meanings in each recurring unit.

Oligomeric or polymeric electrochromic compounds which do not conform to the formula (L) are, in particular, side-chain polymers of the formulae

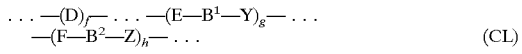  (CL)

and

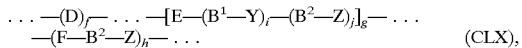  (CLX), in which

D, E and F are units of an oligomer or polymer chain, where the units D, E and F may be arranged either in random distribution or in blocks, B$^1$ and B$^2$ are bridging units, Y and Z, independently of one another, are OX$_2$ or RED$_1$ radicals, where OX$_2$ is the radical of a reversibly electrochemically reducible redox system, and RED$_1$ is the radical of a reversibly electrochemically oxidizable redox system, f, g and h, independently of one another, are integers from 1 to 100,000, in particular from 1 to 10,000, where f+g+h>2, f and h, independently of one another, may also be 0, and i and j, independently of one another, are integers from 1 to 100, in particular from 1 to 10, very particularly 1 or 2.

The oligomers or polymers of the formula (CL) are taken to mean, in particular, those of the formulae

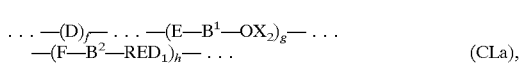  (CLa),

  (CLb),

  (CLc),

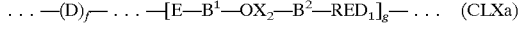  (CLXa)

or

  (CLXb)

in which f is an integer from 0 to 10,000, g and h, independently of one another, are integers from 1 to 10,000, preferably from 1 to 1000, particularly preferably from 1 to 100, and the other radicals are as defined above, where OX$_2$ and/or RED$_1$, in particular if g and/or h are >1, may have different meanings in each recurring unit.

f is preferably >10·(g+h), particularly preferably >100·(g+h).

$OX_2$ and $RED_1$ in the formulae (L) and (La) to (Lf) and (CL) and (CLa) to (CLc) and (CLX) and (CLXa) to (CLXb) are taken to mean, in particular, radicals of the above-described redox systems of the formulae (I) to (X), (CI) to (CIV) and (XX) to (XXXIII) in which the bonding to the bridging unit (B, $B^1$ or $B^2$) takes place via one of the radicals $R^2$ to $R^{19}$, $R^{22}$ to $R^{27}$, $R^{28}$ to $R^{58}$, $R^{61}$, $R^{62}$, $R^{67}$, $R^{68}$, $R^{83}$, $R^{88}$, $R^{122}$ or, in the case where one of the radicals $E^1$ or $E^2$ is $NR^1$ or one of the radicals $E^3$ to $E^{11}$ is $NR^{59}$ or one of the radicals $E^{101}$ to $E^{102}$ is $N^{119}$, takes place via $R^1$, $R^{59}$ or $R^{119}$, and said radicals are then a direct bond, and B, $B^1$ or $B^2$, independently of one another, is a bridge of the formula $-(CH_2)_n-$ or $-Y^1{}_s-[(CH_2)_m-Y^2]_o-(CH_2)_p-Y^3{}_q-$, which may be substituted by $C_1$- to $C_4$-alkyl, $C_1$- to $C_4$-alkoxy, halogen or phenyl, $Y^1$ to $Y^3$, independently of one another, are O, S, $NR^{60}$, COO, CONH, NHCONH, cyclopentanediyl, cyclohexanediyl, phenylene or naphthylene, $R^{60}$ is $C_1$- to $C_6$-alkyl, $C_2$- to $C_6$-alkenyl, $C_4$- to $C_7$-cycloalkyl, $C_7$- to $C_{15}$-aralkyl or $C_6$- to $C_{10}$-aryl, n is an integer from 1 to 12, m and p, independently of one another, are integers from 0 to 8, o is an integer from 0 to 6, and q and s, independently of one another, are 0 or 1, where, in the case where o is >1, $Y^2$ and m may be different in each recurring unit.

$OX_2$ or $RED_1$ in said formulae (L) and (La) to (Lf) and (CL) and (CLa) to (CLc) and (CLX) and (CLXa) to (CLXb) is likewise taken to mean metal complexes if they can be bonded to the bridging units B, $B^1$ or $B^2$ via a covalent bond. An example which may be mentioned is ferrocene.

$OX_2$ and $RED_1$ in the formulae (L) and (La) to (Lf) and (CL) and (CLa) to (CLc) and (CLX) and (CLXa) to (CLXb) are very particularly taken to mean radicals of the above-described redox systems of the formulae (I), (V), (XX), (XXII), (XXIII), (XXV), (XXVI) and (XXXIII) for $RED_1$ is taken to mean ferrocene.

D, E and F in the formulae (CL) and (CLa) to (CLc) and (CLX) and (CLXa) to (CLXb) are taken to mean units which result in the construction of oligo- or polyacrylates, -methacrylates, -styrenes, -siloxanes, -carbonates, -amides, -esters, -ureas, -urethanes or -saccharides, in particular oligo- and polyacrylates, -methacrylates and -styrenes and their mixed oligomers or polymers.

D preferably conforms to the formula $$-CHY^{10}-CHY^{11}- \quad (CLXXI)$$

and

E and F preferably conform, independently of one another, to the formula $$-CHY^{12}-CHY^{13}- \quad (CLXXII),$$

in which $Y^{10}$ and $Y^{12}$, independently of one another, are hydrogen or $C_1$- to $C_4$-alkyl, $Y^{11}$ is hydrogen, halogen, $C_1$- to $C_4$-alkyl, aryl or $-COO-C_1$- to $C_8$-alkyl, and $Y^{13}$ is a direct bond or one of the bridges of the formulae $-O-$, $-CO-O-$, $-CO-NH-$ or $-C_6H_4-$ to $B^1$ or $B^2$.

Examples are of the formula (La)

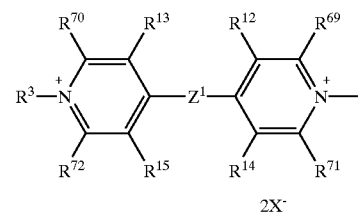

(La1)

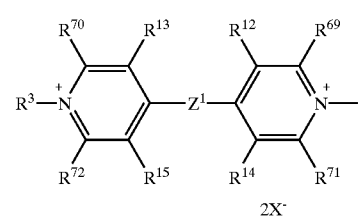

(La2)

-continued
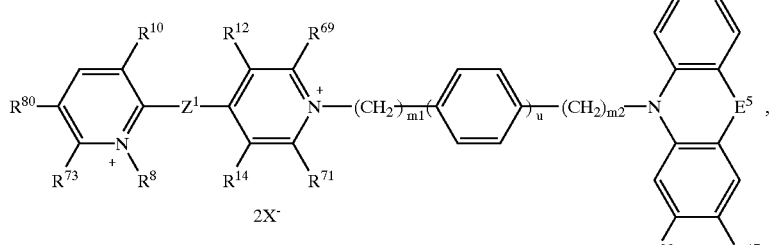
(La3)
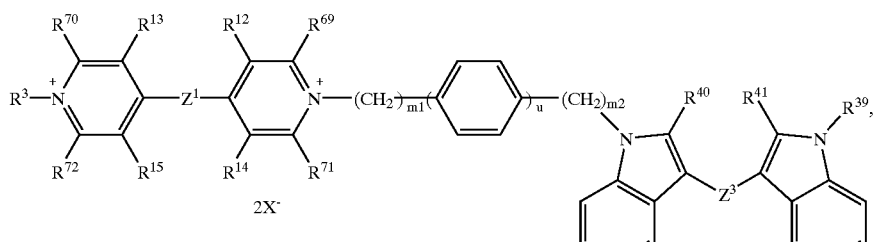
(La4)
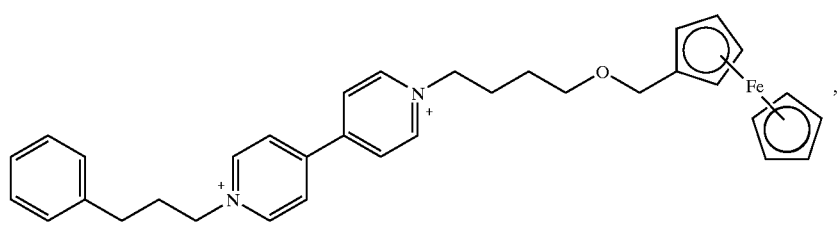
(La5)
of the formula (Lb)
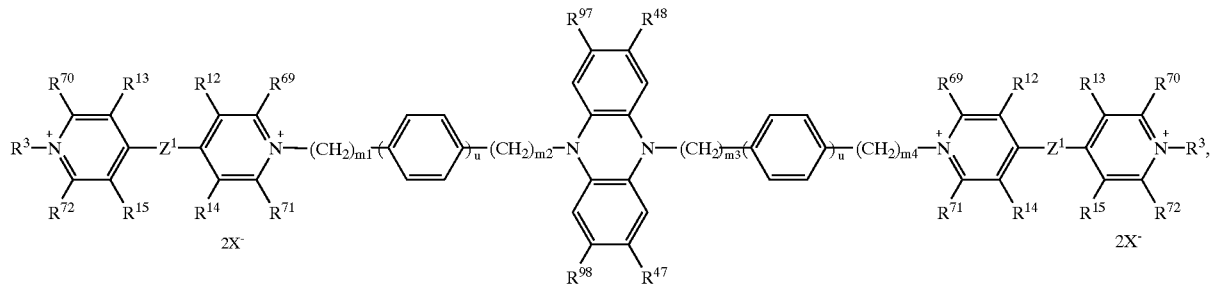
(Lb1)
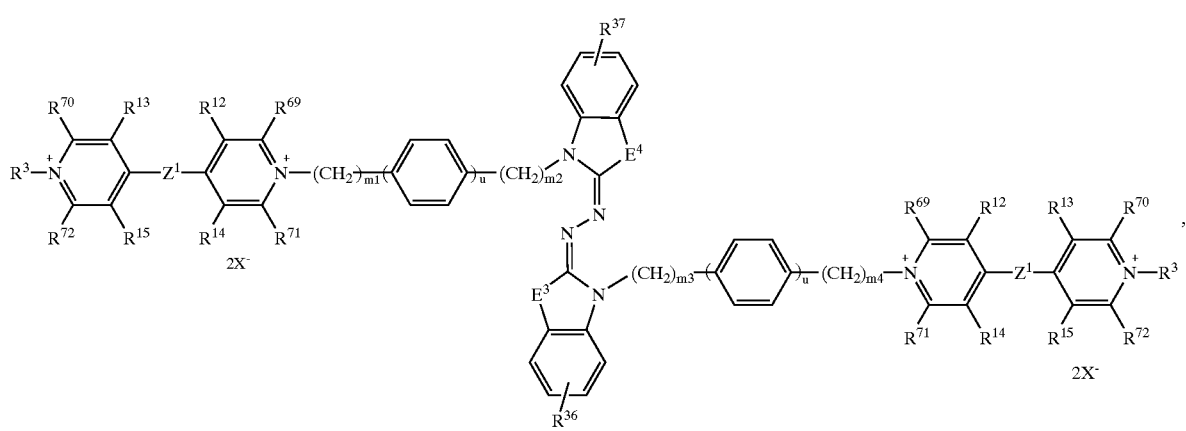
(Lb2)

-continued
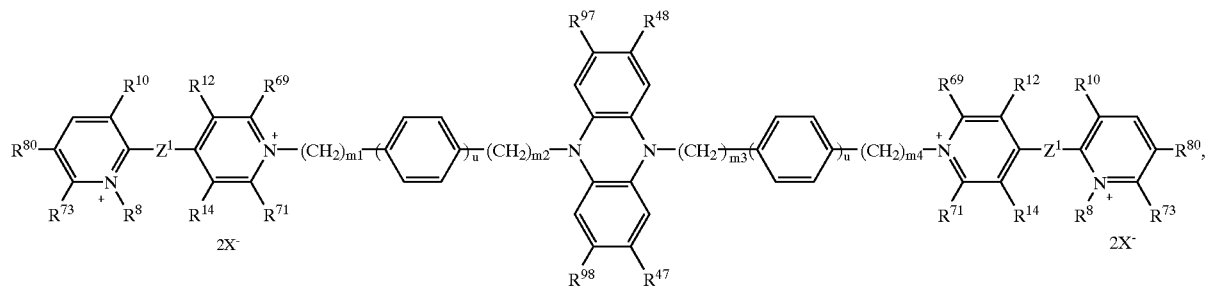
(Lb3)
of the formula (Lc)
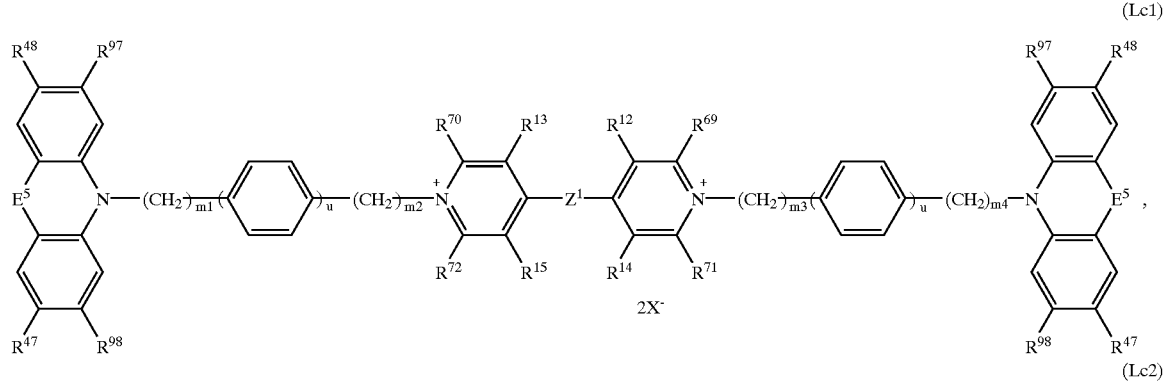
(Lc1)
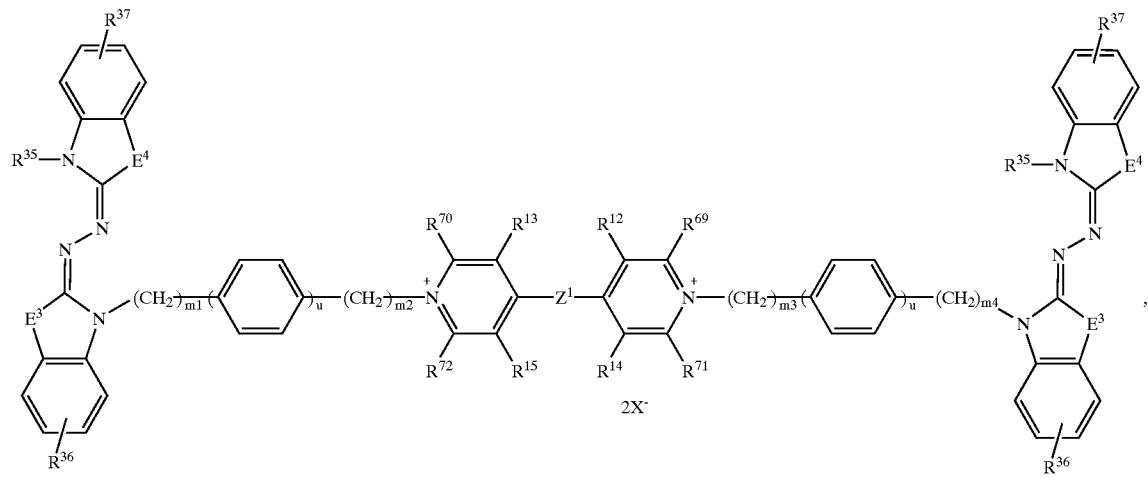
(Lc2)
of the formula (Ld)
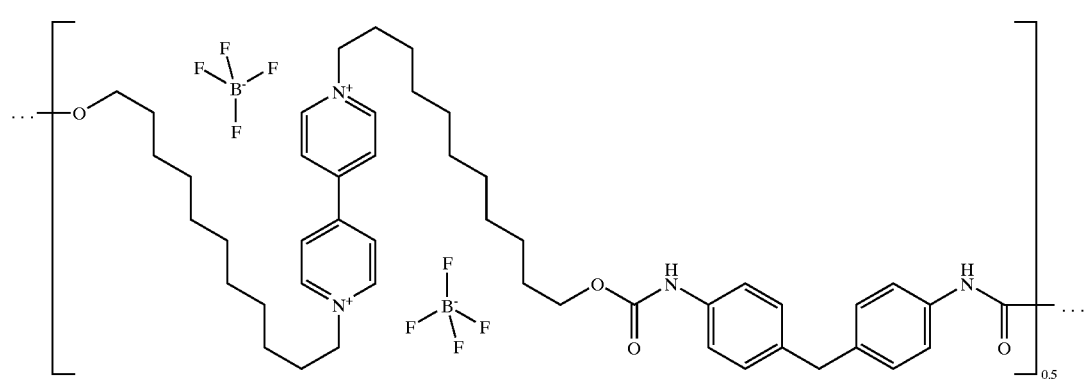
(Ld1)

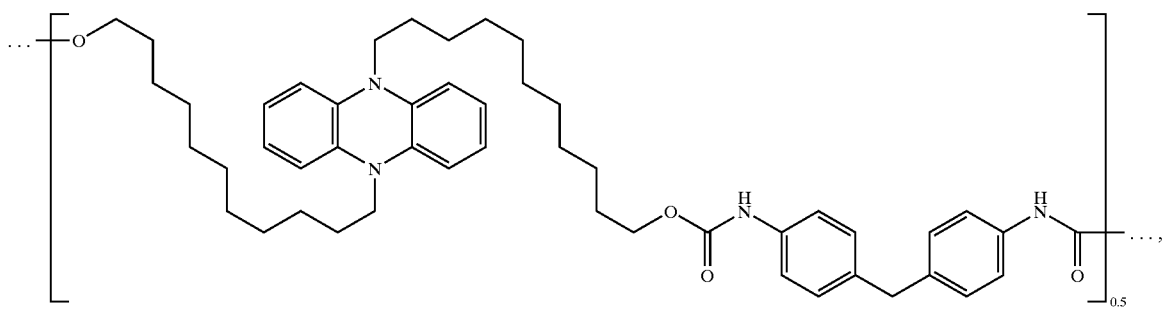
(Ld2)
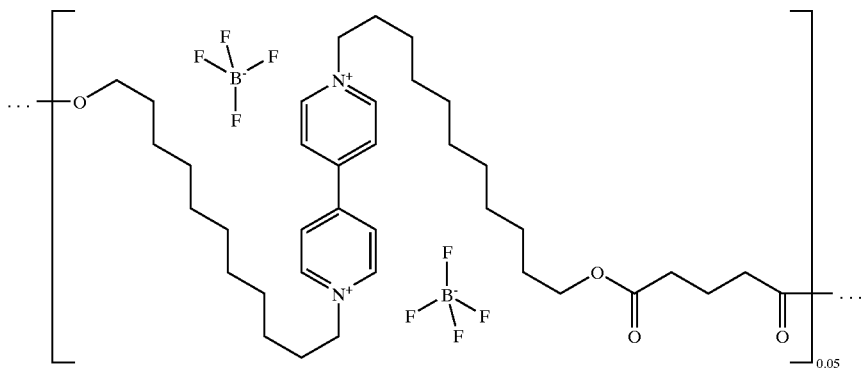
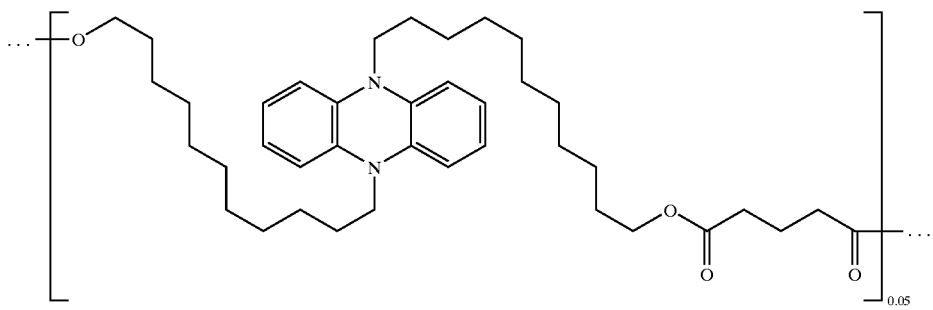
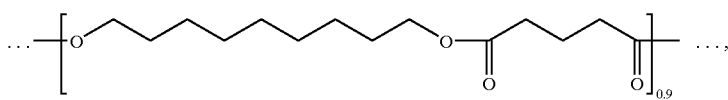
(Ld3)
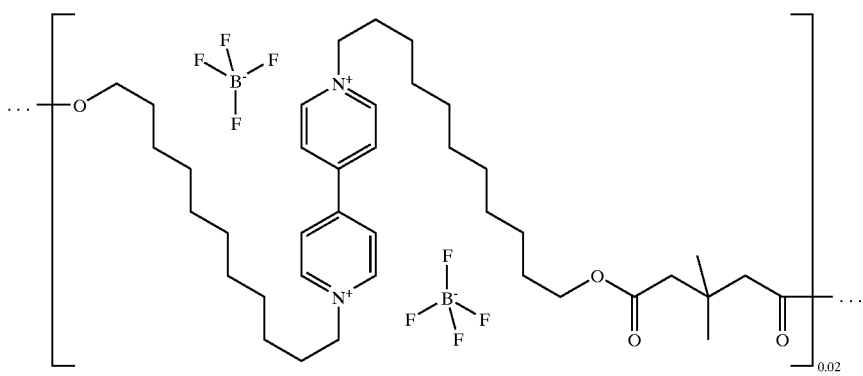

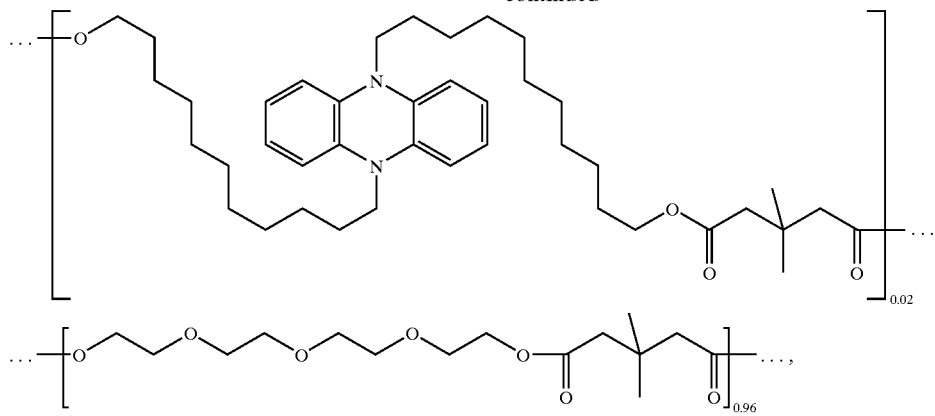
of the formula (Le)
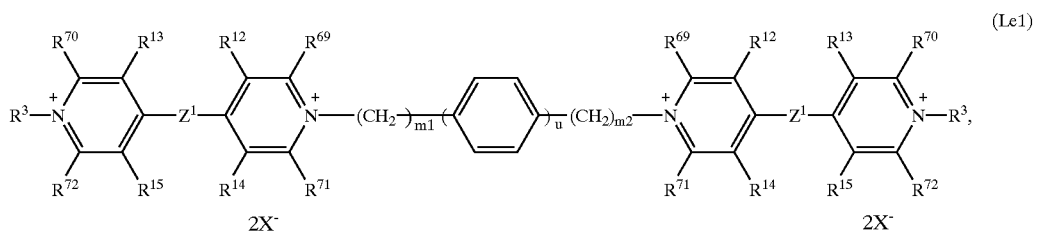
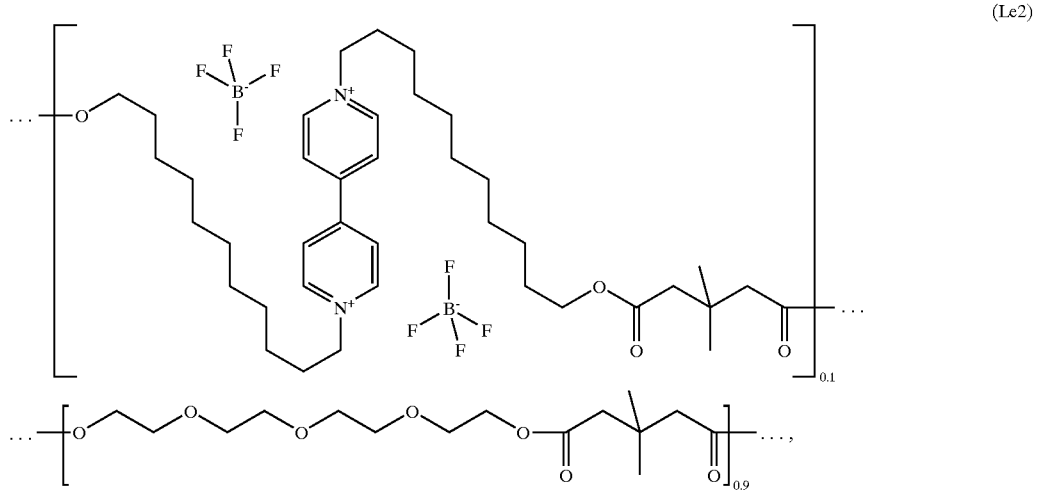
of the formula (Lf)
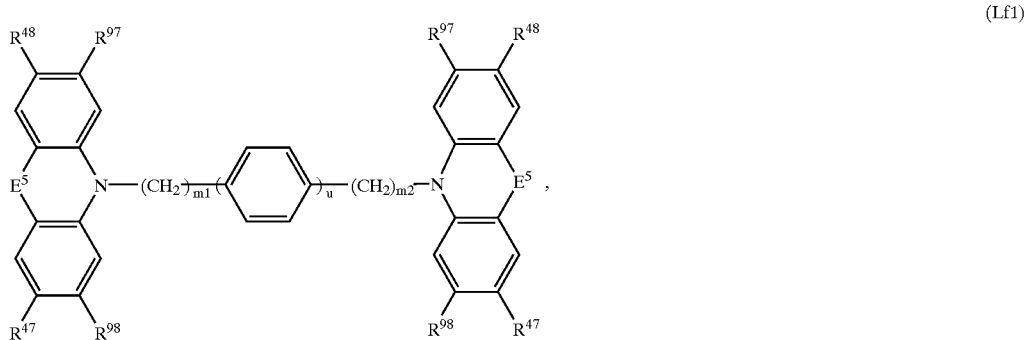

-continued
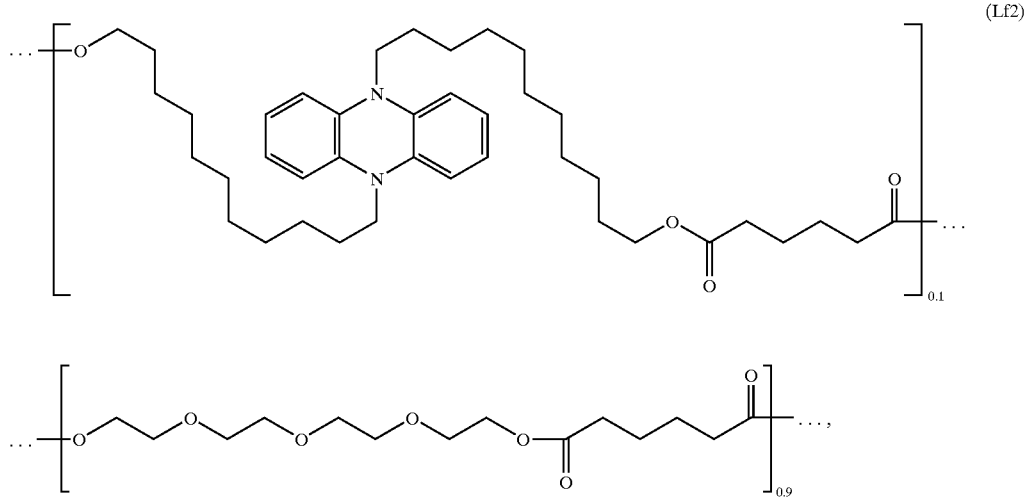
in which
m1 to m4, independently of one another, are integers from 1 to 5,
u is 0 or 1, and
the other radicals are as defined above.
Examples are of the formula (CLa)
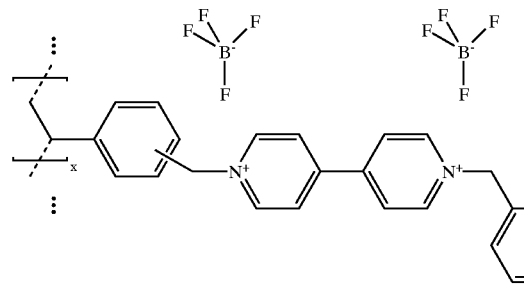
(CLa1)
x = 0.005
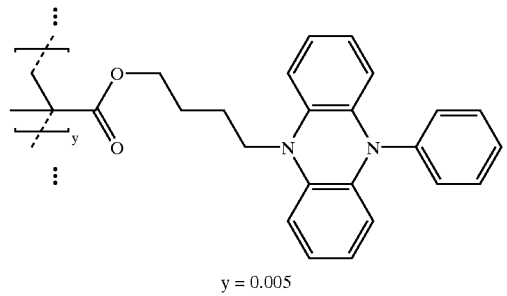
y = 0.005
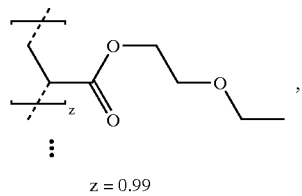
z = 0.99
of the formula (CLb)
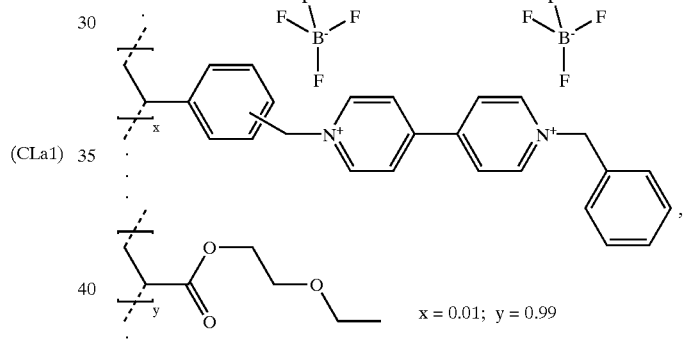
(CLb1)
x = 0.01; y = 0.99
of the formula (CLc)
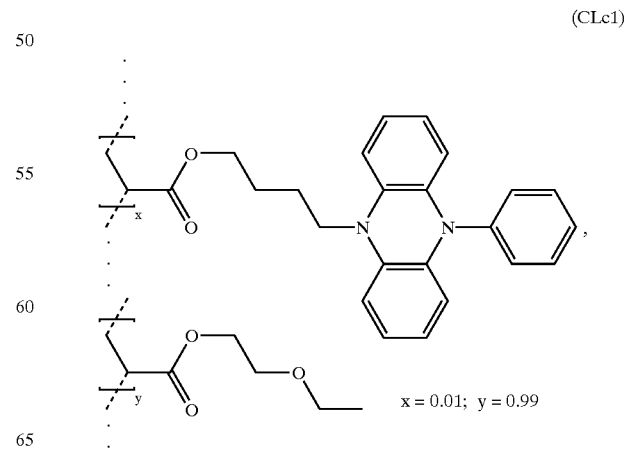
(CLc1)
x = 0.01; y = 0.99 of the formula (CLXa)

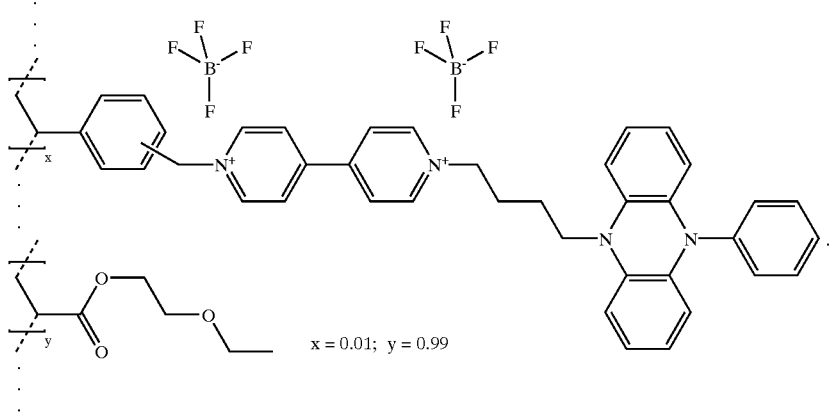

(CLXa1)

Examples of metal salts or metal complexes which can be used as $OX_2$ or $RED_1$ are $Fe^{3+2+}$, $Ni^{3+/2+}$, $Co^{3+/2+}$, $Cu^{2+/+}$, $[Fe(CN)_6]^{3-/4-}$, $Fe_4[Fe(CN)_6]_3{}^{0/4-}$, $[Co(CN)_6]^{3-/4-}$, $[Fe(cyclopentadienyl)_2]_{0/+}$, $Lu(Pc)^{2+\ to\ 2-}$ (Pc=phthalocyanine), $Fe[Fe(CN)_6]^{0/1-}$.

Suitable counterions for metal ions and cationic complexes are all redox-inert anions X, as described more precisely later, and suitable counterions of the anionic complexes are all redox-inert cations $M'^+$, for example alkali metals or quaternary ammonium salts, such as $Na^+$, $K^+$, $N(CH_3)_4{}^+$, $N(C_4H_9)_4{}^+$, $C_6H_5CH_2N(CH_3)_3{}^+$ and others.

Preference is likewise given to an electrochromic device according to the invention containing mixtures of the electrochromic substances mentioned above in general and preferred terms. Examples of such mixtures are (I)+(CI)+ (XXVI), (I)+(IV)+(XXII), (La)+(I)+(XXVI), (La)+(CI), (LX)+(LXI), (LXV)+XXVI), (CLII)+(XXVI), without this being intended to express any restriction.

The mixing ratios are variable within broad limits. They allow a desired hue or grey shade to be optimized and/or the desired dynamics of the device to be optimized.

In the substituent definitions given above, alkyl radicals, including derivatives, are, for example, alkoxy or aralkyl radicals, preferably those having 1 to 12 C atoms, in particular having 1 to 8 C atoms, unless stated otherwise. They can be straight-chain or branched and can optionally carry further substituents, such as $C_1$- to $C_4$-alkoxy, fluorine, chlorine, hydroxyl, cyano, $C_1$- to $C_4$-alkoxycarbonyl or COOH.

The term cycloalkyl radicals is taken to preferably mean those having 3 to 7 carbon atoms, in particular having 5 or 6 carbon atoms. Alkenyl radicals are preferably those having from 2 to 8 carbon atoms, in particular 2 to 4 carbon atoms.

Aryl radicals, including those in aralkyl radicals, are phenyl or naphthyl radicals, in particular phenyl radicals. They can be substituted by 1 to 3 of the following radicals: $C_1$- to $C_6$-alkyl, $C_1$- to $C_6$-alkoxy, fluorine, chlorine, bromine, cyano, hydroxyl, $C_1$- to $C_6$-alkoxycarbonyl or nitro. Two adjacent radicals can also form a ring.

The term optionally benzo-fused aromatic or quasi-aromatic, five- or six-membered heterocyclic rings is taken to mean, in particular, imidazole, benzimidazole, oxazole, benzoxazole, thiazole, benzothiazole, indole, pyrazole, triazole, thiophene, isothiazole, benzisothiazole, 1,3,4- or 1,2,4-thiadiazole, pyridine, quinoline, pyrimidine and pyrazine. They may be substituted by 1 to 3 of the following radicals: $C_1$- to $C_6$-alkyl, $C_1$- to $C_6$-alkoxy, fluorine, chlorine, bromine, cyano, nitro, hydroxyl, mono- or di-$C_1$- to $C_6$-alkylamino, $C_1$- to $C_6$-alkoxycarbonyl, $C_1$- to $C_6$-alkylsulfonyl, $C_1$- to $C_6$-alkanoylamino, phenyl or naphthyl. Two adjacent radicals may also form a ring.

The electrochromic substances are either known (Topics in Current Chemistry, Vol. 92, pp. 1–44, (1980), Angew. Chem. 90, 927 (1978), or can be prepared analogously. The compounds of the formula (L) are likewise known (WO-A 97/30134) or can be synthesized from components known per se, for example in accordance with the following scheme:

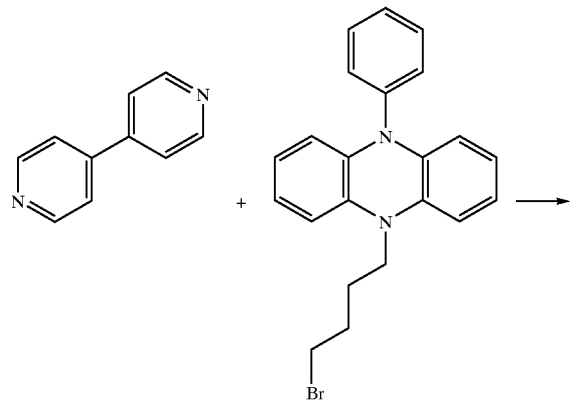

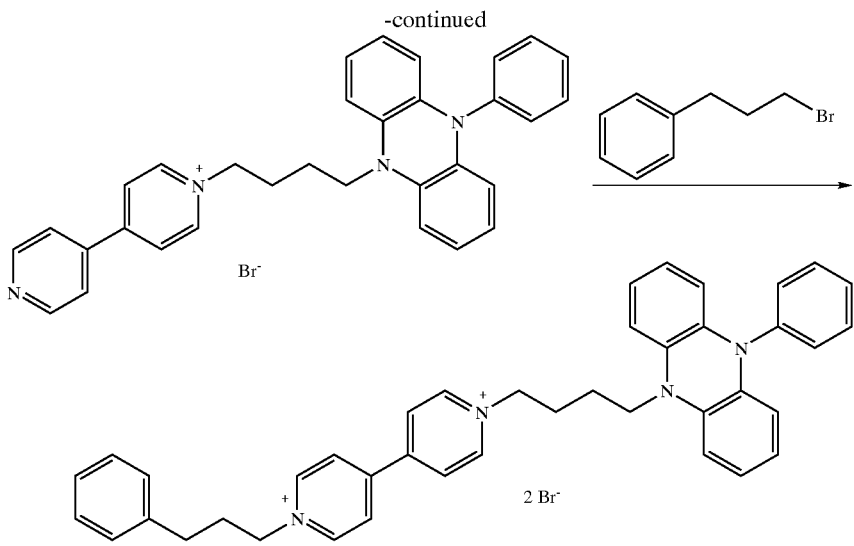

The compounds of the formula (CL) and (CLX) can be prepared by polymerization from units know per se, for example the following:

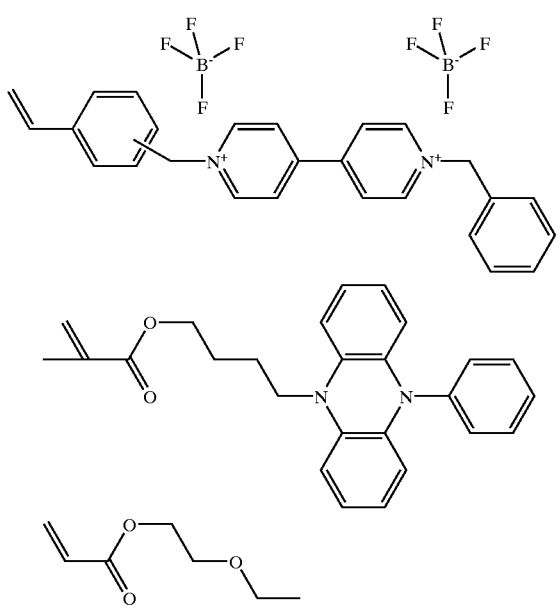

Synthetically required ions, such as bromide, are subsequently replaced by redox-inert ions.

Particular preference is given to the electrochromic compounds of the formulae (I), (II), (III), (IV), (V), (XX), (XXII), (XXIII), (XXVI), (XXVII) and ferrocene, and the bridged compounds of the formula (L) or side-chain polymers of the formula (CL) or (CLX) containing at least one of these formulae as $OX_2$ or $RED_1$.

In this selection and likewise in the following particular and exceptional selections of electrochromic compounds, it must always be ensured that the electrochromic medium contains at least one $OX_2$ and at least one $RED_1$. If, for example, $OX_2$=formula (I), the electrochromic medium must also contain an $RED_1$, preferably from the selection of the preferred $RED_1$ of the formulae (XX), (XXII), (XXIII), (XXVI) and (XXVII), but also from the selection given in general terms above of $RED_1$ of the formulae (XX) to (XXXIII), and of the above-mentioned metal salts, complexes or anions $X^-$ suitable as $RED_1$. This also applies analogously to the preferred and particularly preferred $RED_1$.

Very particular preference is given to the electrochromic compounds of the formulae (I), (II), (IV), (V), (XXII), (XXIII), (XXVI) and (XXVIII) in which $R^2$, $R^3$, $R^8$ and $R^9$, independently of one another, are methyl, ethyl, propyl, butyl, pentyl, hexyl, heptyl, benzyl, phenethyl, phenylpropyl, phenyl, 2-methylphenyl or 2,6-dimethylphenyl or $R^8$ and $R^9$ together form a —$(CH_2)_2$— or —$(CH_2)_3$— bridge, $R^{10}$ to $R^{15}$ are hydrogen, $R^{69}$ to $R^{73}$, $R^{80}$ and $R^{81}$, independently of one another, are hydrogen or methyl, or $R^{12}$; $R^{69}$, $R^{13}$; $R^{70}$, $R^{73}$; $R^{80}$ and/or $R^{74}$; $R^{81}$ form a —CH=CH—CH=CH— bridge, $Z^1$ is a direct bond or —CH=CH—, $Z^2$ is —$(CH_2)_r$—, r is an integer from 2 to 6, $X^-$ is an anion which is redox-inert under the conditions, $R^{34}$, $R^{35}$, $R^{38}$ and $R^{39}$, independently of one another, are methyl, ethyl, propyl, butyl, benzyl, phenethyl, phenylpropyl or phenyl, $R^{36}$ and $R^{37}$ are hydrogen, $Z^3$ is a direct bond or a —CH=CH— bridge, $Z^4$ is a direct double bond, $R^{40}$ and $R^{41}$ are identical and are hydrogen or methyl, $E^3$ and $E^4$ are identical and are S, N—$R^{59}$ or $C(CH_3)_2$, $E^5$ is $NR^{59}$, $R^6$ to $E^9$ are identical and are S, $R^{47}$, $R^{48}$, $R^{97}$ and $R^{98}$, independently of one another, are hydrogen, methyl, methoxy, cyano, phenyl or phenoxy, $R^{49}$ to $R^{52}$, independently of one another, are hydrogen, methyl, cyano or methoxycarbonyl, or $R^{49}$; $R^{50}$ and/or $R^{51}$; $R^{52}$ form a —$(CH_2)_3$— or —CH=CH—CH=CH— bridge, $R^{90}$ to $R^{100}$ are hydrogen, and the bridged compounds of the formula (L), in particular of the formula (La), containing at least one of these formulae as $OX_2$ or $RED_1$, where
  B is —$(CH_2)_n$—, and
  n is an integer from 3 to 6, and the side-chain polymers of the formula (CL) or (CLX), in particular of the formula (CLXa), containing at least one of these formulae as $OX_2$ or $RED_1$,
where
  D represents the formula (CLXXI),
  E and F represent the formula (CLXXII),
  $Y^{10}$ and $Y^{12}$, independently of one another, are hydrogen or methyl,
  $Y^{11}$ is —$COOCH_3$ or —$COOCH_2CH_2OCH_2CH_3$,
  $Y^{13}$ is a bridge of the formulae —CO—O— or —$C_6H_4$— to $B^1$ or $B^2$,
  $B^1$ and $B^2$, independently of one another, are a bridge of the formula —$(CH_2)_n$—, and
  n is an integer from 1 to 6.

Very outstandingly suitable for the purposes of the invention are the electrochromic compounds of the formulae (I) and (II)
in which
  $R^2$ and $R^3$ are identical and are methyl, ethyl, butyl, heptyl or phenylpropyl,
  $R^{12}$ to $R^{15}$ and $R^{69}$ to $R^{72}$ are hydrogen,
  $Z^1$ is a direct bond,
  $Z^2$ is —$(CH_2)_3$— or —$(CH_2)_4$—, and
  $X^-$ is a redox-inert anion or $I^-$.

Very outstandingly suitable for the purposes of the invention are the electrochromic compounds of the formula (XXVI)
in which
  $E^5$ is $NR^{59}$,
  $R^{46}$ and $R^{59}$, independently of one another, are methyl, ethyl, propyl, butyl, phenylpropyl or phenyl,
  $R^{47}$, $R^{48}$, $R^{97}$ and $R^{98}$, independently of one another, are hydrogen, phenyl or phenoxy, and
  $R^{99}$ and $R^{100}$ are hydrogen.

Likewise very outstandingly suitable for the purposes of the invention are the electrochromic compounds of the formula (La)
in which
  $OX_2$ is a radical of the formula (I),
  $RED_1$ is a radical of the formula (XXVI), and
  B is —$(CH_2)_n$—,
where
  n is an integer from 3 to 6,
  $R^2$ and $R^{46}$ are a direct bond to B,
  $R^3$, $R^{12}$ to $R^{15}$, $R^{69}$ to $R^{72}$, $Z^1$ and $X^-$ have the outstanding meaning given above,
  $R^{47}$, $R^{48}$, $R^{97}$ to $R^{100}$ are hydrogen or a maximum of 2 of the radicals $R^{47}$, $R^{48}$, $R^{97}$ and $R^{98}$ are phenoxy,
  $E^5$ is $NR^{59}$, and
  $R^{59}$ is methyl, ethyl, butyl, heptyl, phenylpropyl or phenyl.

Likewise very outstandingly suitable for the purposes of the invention are the electrocliromic compounds of the formiula (CLXa)
in which
  $OX_2$ is a radical of the formula (I),
  $RED_1$ is aradical of the formula (XXVI),
  D represents the formula (CLXXI),
  E represents the formula (CLXXII),
  $Y^{10}$ and $Y^{12}$, independently of one another, are hydrogen or methyl,
  $Y^{11}$ is —$COOCH_2CH_2OCH_2CH_3$,
  $Y^{13}$ is a bridge of the formulae —CO—O— or —$C_6H_4$— to $B^1$ or $B^2$,
  $B^1$ and $B^2$, independently of one another, are a bridge of the formulae —$(CH_2)_n$—,
where
  n is an integer from 1 to 6,
  $R^2$ is a direct bond to $B^1$,
  $R^3$ and $R^{46}$ are a direct bond to $B^2$,
  $R^{12}$, $R^{15}$, $R^{69}$ to $R^{72}$, $Z^1$ and $X^-$ have the outstanding meaning given above,
  $R^{47}$, $R^{48}$, $R^{97}$ to $R^{100}$ are hydrogen or a maximum of 2 of the radicals $R^{47}$, $R^{48}$, $R^{97}$ and $R^{98}$ are phenoxy,
  $E^5$ is $NR^{59}$, and
  $R^{59}$ is methyl, ethyl, butyl, heptyl, phenylpropyl or phenyl.

If desired, the electrochromic device according to the invention comprises in its electrochromic medium at least one solvent in which the electrochromic substances, if used a conductive salt and if used further additives are dissolved. The solvent can also have been thickened in the form of a gel, for example by polyelectrolytes, porous solids or nanoparticles having large active surface areas.

On use of polymeric electrochromic compounds, in particular of the formulae (L) and (Ld) to (Lf) and (CL) and (CLa) to (CLc) and (CLX) and (CLXa) to (CLXb), the solvent can be omitted. It is also possible to mix such polymers, for example formula (LXV) and (LXVII). If desired, further $OX_2$ or $RED_1$ are mixed with the polymer, for example formula (XXVI) in polymer of the formula (LXV).

Suitable solvents are all solvents which are redox-inert under the selected voltages and which cannot eliminate electrophiles or nucleophiles or themselves react as sufficiently strong electrophiles or nucleophiles and thus could react with the colored free-radical ions. Examples are propylene carbonate, γ-butyrolactone, acetonitrile, propionitrile, benzonitrile, glutaronitrile, methylglutaronitrile, 3,3'-oxydipropio-nitrile, hydroxypropionitrile, dimethylformamide, N-methylpyrrolidone, sulpholane, 3-methylsulpholane or mixtures thereof. Preference is given to propylene carbonate, benzonitrile and mixtures with one another or with glutaronitrile or 3methyl-sulpholane. Particular preference is given to propylene carbonate. Particular preference is likewise given to benzonitrile.

The electrochromic medium can contain at least one inert conductive salt. In particular if at least one of the substances of the redox pair $RED_1/OX_2$ is of an ionic nature, the addition of a conductive salt can be omitted.

Suitable inert conductive salts are lithium, sodium and tetraalkylammonium salts, in particular the latter. The alkyl groups can contain between 1 and 18 carbon atoms and can be identical or different. Preference is given to tetrabutylammonium. Suitable anions for these salts, in particular as anions $X^-$ in the formulae (I) to (VI), (CI), (CII) and (CV) to (CVII) and in the metal salts are all redox-inert, colorless anions.

Examples are tetrafluoroborate, tetraphenylborate, cyanotriphenylborate, tetramethoxyborate, tetrapropoxyborate, tetraphenoxyborate, perchlorate, chloride, nitrate, sulphate, phosphate, methanesulphonate, ethanesulphonate, tetradecanesulphonate, pentadecanesulphonate, trifluoromethanesulphonate, perfluorobutanesulphonate, perfluorooctanesulphonate, benzenesulphonate, chlorobenzenesulphonate, toluenesulphonate, butylbenzenesulphonate, tert-butylbenzenesulphonate, dodecylbenzenesulphonate, trifluoromethylbenzenesulphonate, hexafluorophosphate, hexafluoroarsenate, hexafluorosilicate, 7,8- or 7,9-dicarbanidoundecaborate(-1) or (-2), which are optionally substituted on the B and/or C atoms by one or two methyl-, ethyl-, butyl- or phenyl groups, dodecahydrodicarbadodecaborate(-2) or B-methyl-C-phenyldodecahydrodicarbadodecaborate(-1).

Likewise suitable, including as anions X⁻ in the formulae (I) to (VI), (CI), (CII) and (CV) to (CVII) and in the metal salts, are the above-mentioned anions which can also take on the role of a $RED_1$, for example $I^-$ and $I_3^-$.

As is known, for example, from K. Deuchert and S. Hünig, Angew. Chem. 90, 927–938 (1978) and S. Hunig and H. Bemeth, Topics in Current Chemistry, Vol. 92, pp. 1–44 (1980), many redox systems, for example those of the formulae (I) to (XII) and (XX) to (XXXIII), exist in three oxidation states in equilibrium with one another:

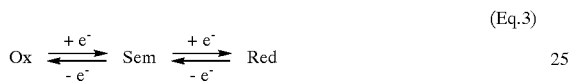

(Eq.3)

Sem is a free-radical species and is generally deeply colored, while Ox and Red are colorless or less deeply colored (hypsochromic relative to Sem).

Preferred $OX_3$ are the oxidation states Sem formed from the corresponding $RED_3$, in particular of the formulae (XII) to (XX), in accordance with this equation by one-electron oxidation and the Ox oxidation states formed by two-electron oxidation.

Preferred $RED_3$ are the oxidation states Sem formed from the corresponding $OX_3$, in particular of the formulae (I) to (XII), in accordance with this equation by one-electron reduction and the oxidation states Red formed by two-electron reduction.

These $OX_3$ and $RED_3$ may also be incorporated into oligomers or polymers of the formulae (L), (CL) or (CLX), where at least one Y or Z is $OX_3$ or $RED_3$ and the other is $OX_2$ and/or $RED_1$.

The $OX_3$ or $RED_3$ can react with the other electrochromic substances $OX_2$ and $RED_1$ of the electrochromic medium by disproportionation or comproportionation reactions. In general, $OX_3$ or $RED_3$ is present in the oxidation state Sem in the electroless electrochromic medium, provided that this is one of the above-described redox systems obeying Equation 3.

An analogous situation applies to metal salts and complexes. If, by contrast, the oxidation states of such salts or complex differ by only 1, as, for example, in [Fe(cyclopentadienyl)$_2$]$^{0/+}$, the oxidation state Sem then does not arise in accordance with Equation 3.

Preferred $OX_3$ are accordingly [Fe(cyclopentadienyl)$_2$]$^+$, the oxidation state Sem of compounds of the formula (XXII), (XXIII), (XXIV), (XXV), (XXVI), particularly preferably [Fe(cyclopentadienyl)$_2$]$^+$ and the oxidation state Sem of compounds of the formulae (XXII) and (XXVI).

Preferred $RED_3$ are accordingly the oxidation state Sem of compounds of the formulae (I), (II), (III), (IV) and (V), particularly preferably the oxidation state Sem of the formula (IV).

$OX_3$ and $RED_3$ can be added to the electrochromic medium as such or alternatively generated in the medium, for example by comproportionation or disproportionation reaction or other redox reactions.

Examples of directly added $OX_3$ and $RED_3$ are [Fe(cyclopentadienyl)$_2$]$^+$ and the oxidation state Sem of compounds of the formulae (XXII), (XXVI) and (IV).

An example of a comproportionation reaction is the reaction of the oxidation states Red and Ox of compounds of the formula (XXII) corresponding to the formula

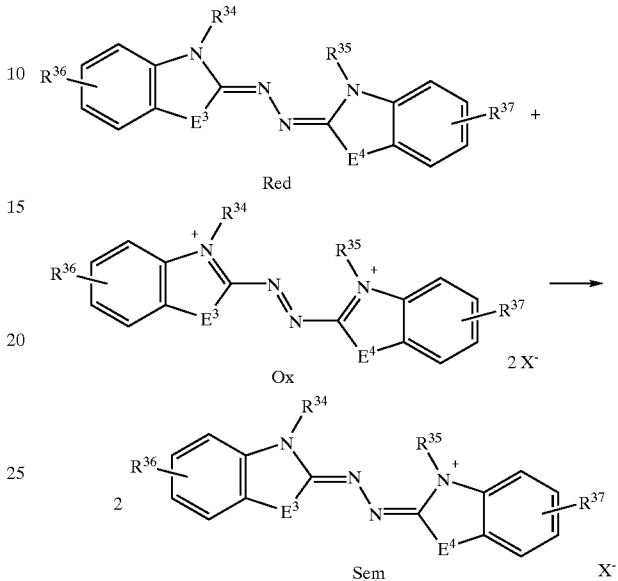

The term "other redox reactions" is taken to mean, for example, the reduction or oxidation of electrochromic compounds of the electrochromic medium, preferably some (<30%, preferably <10%, of the amount present in the electrochromic medium) of $OX_2$ or $RED_1$ preferably to give their oxidation states Sem, which take on the role of $RED_3$ or $OX_3$, by means of a reducing agent or oxidant whose redox potential has a value which is greater than that of $OX_2$ or $RED_1$. An example of another redox reaction of this type with participation of the compound of the formula (XXVI) and a metal complex is shown in the following formula equation:

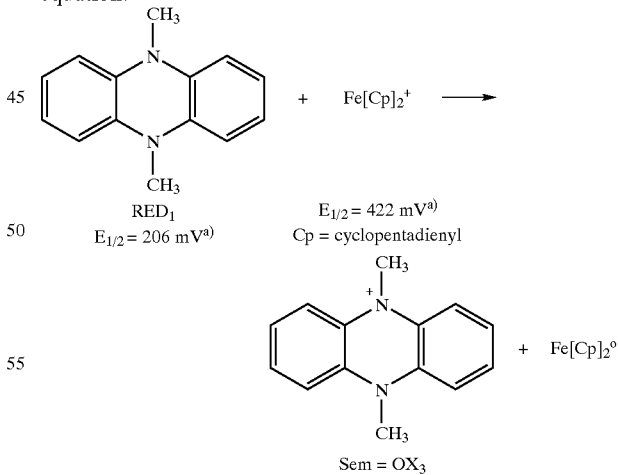

[a]against standard hydrogen electrode

The product formed from the oxidant or reducing agent in the redox reaction (here Fe[Cp]$_2$) may finally take on the role of an $RED_1$ (as in the case of the example of the formula equation) or $OX_2$ in the electrochromic medium.

Examples of combinations of $OX_2$, $RED_1$ and $OX_3$/$RED_3$ are shown in the following tables:

| Example | OX$_2$ | RED$_1$ | OX$_3$ |
| --- | --- | --- | --- |
| a | (1,1'-bis(3-phenylpropyl)-4,4'-bipyridinium, 2BF$_4^-$) | Fe[Cp]$_2$ [a)] | Fe[Cp]$_2^+$BF$_4^{-a)}$ |
| b | (1,1'-bis(3-phenylpropyl)-4,4'-bipyridinium, 2BF$_4^-$) | N,N'-dimethyl-9,10-dihydrophenazine | N,N'-dimethylphenazinium BF$_4^-$ |
| c | (1-(3-phenylpropyl)-1'-(4-(phenylphenazinyl)butyl)-4,4'-bipyridinium, 2BF$_4^-$) | | N,N'-dimethylphenazinium BF$_4^-$ |

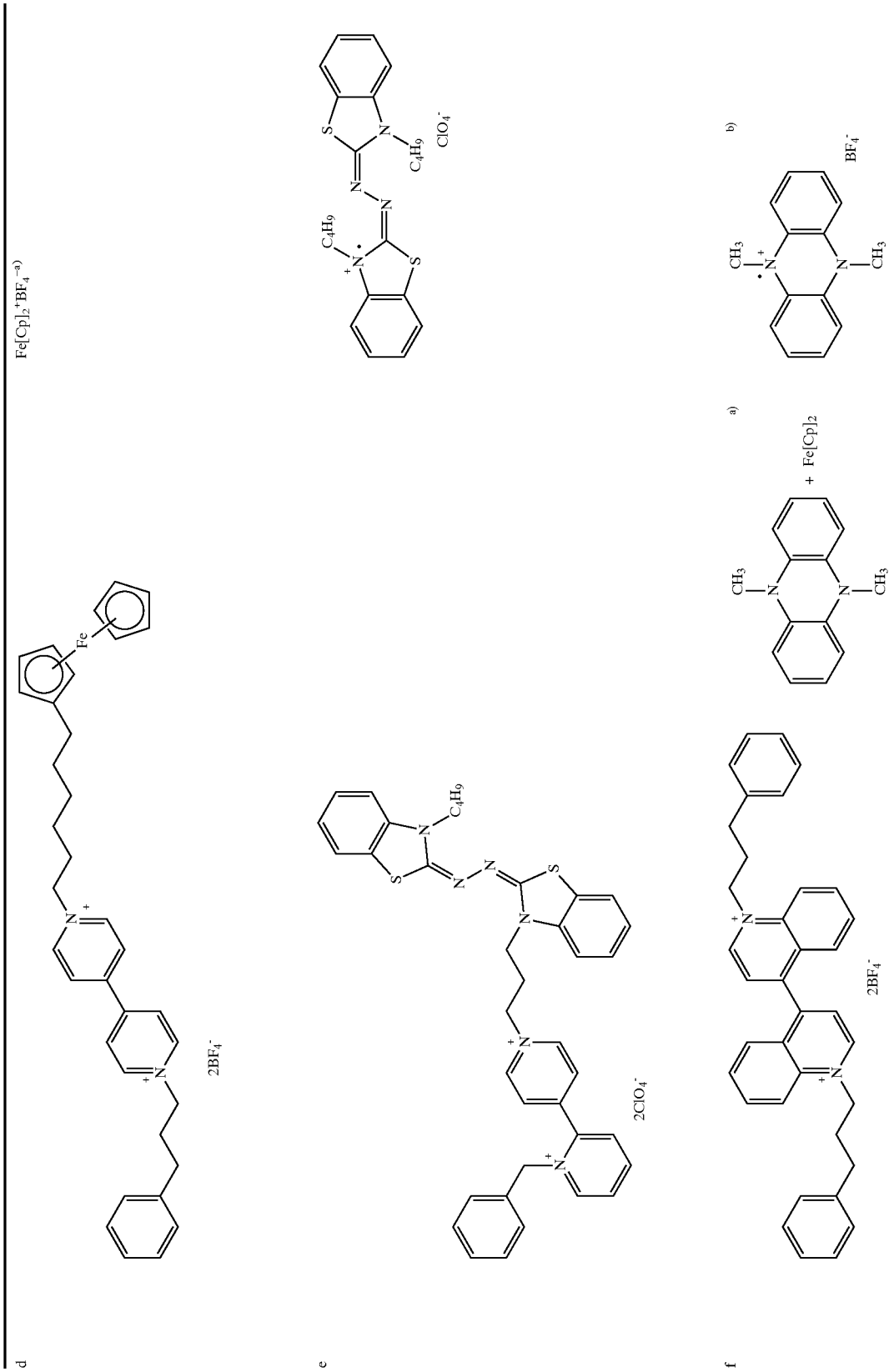

-continued
| Example | OX$_2$ | RED$_1$ | RED$_3$ |
|---|---|---|---|
| g | 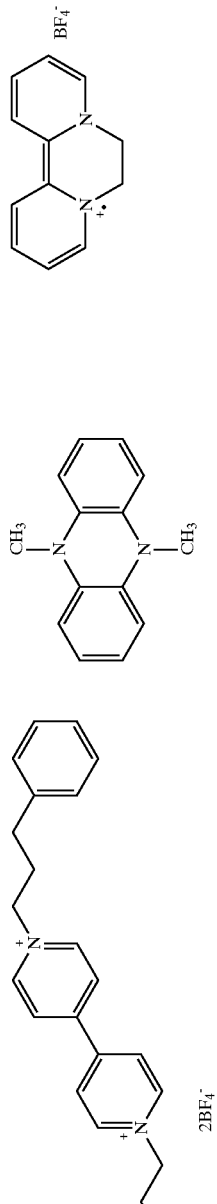 | 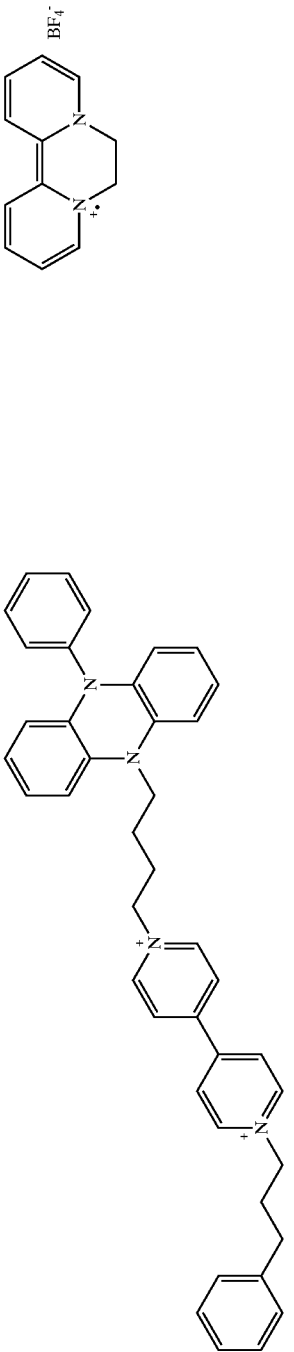 | |
| h | | |  |
[a] Cp = cyclopentadienyl
[b] from 5,10-dimethyldihydrophenazine + Fe[Cp]$_2^+$BF$_4^-$ The above-outlined advantages of accelerated self-extinguishing and increased edge sharpness make the electrochromic media according to the invention particularly suitable for use in electrochromic devices according to the invention.

These devices are, in particular, display devices. In such display devices, at least one of the two conductive layers is divided into segments which are electrically insulated from one another and are provided with electrical contacts via supply lines. These supply lines are advantageously electrically insulated from the electrochromic medium. Depending on the structuring of the division into segments, the display devices can indicate simple symbols, characters or numerals, or bars or dots which can serve for the display of complex patterns, such as characters or numerals, but also of pictures. Such display devices may also be part of a contact sensor, e.g., they are integrated into the sensor and indicate its switching state. A contact sensor reacts, for example, to pressure, a change in the electrical conduction capacity or light transmission capacity or a change in inductance. In general, it consists of a plate, contact with which triggers the sensor. A display device according to the invention may now be integrated into this plate, it being possible for it to be located either in or outside the contact-sensitive part of the plate.

In particular, the electrochromic devices according to the invention are analogue displays. In analogue displays, the two conductive coatings are generally not divided into segments. However, they can have different conductivity. For example, a device of this type is constructed from two strip-shaped or arc-shaped plates or films to which voltage is supplied at the two opposite ends. In addition, the two conductive layers may be electrically connected to one another at one end of the device, for example via a resistance or via a control unit. However, the device may also be constructed in circular, oval, rectangular or square form or in a similar form. Through at least one electrical connection between the conductive layers of the two plates or films at any desired point, any desired color depth gradients, which can be used for display purposes, build up on application of voltage. A circular or square arrangement with an electrical connection in its center can serve as adjustable diaphragm for light.

In particular, the electrochromic devices according to the invention are devices of all types in which rapid self-extinguishing is important. These may also be, for example, single-segment devices which are used, for example, for the display of a rapidly changing switching state. Spectacle lenses, sight protection screens or automobile rear-view mirrors may also be such applications.

In display devices, rapid self-extinguishing of the switched segments takes place through use of the electrochromic medium according to the invention when they convert from the switched state into the unswitched, for example short-circuited, state. A rapid change of the displayed picture is thus possible. This is also the case if a segment was switched on for a long time. In addition, the segments exhibit increased edge sharpness and a reduction in colored zones around the segment, which may form due to lateral diffusion of the colored electrochromic substances.

In analogue displays or diaphragms, the use of the electrochromic medium according to the invention produces a sharp boundary between the colored and colorless zone and the possibility of rapid movement of this zone on a change in the applied voltage, e.g., rapid reaction to fast-changing signals. This is particularly important in a diaphragm in a photographic apparatus or a film camera.

Figures

The invention is explained in greater detail by the following figures, in which:

FIG. 1 shows a diagram of a structured electrochromic cell

Figure 2:
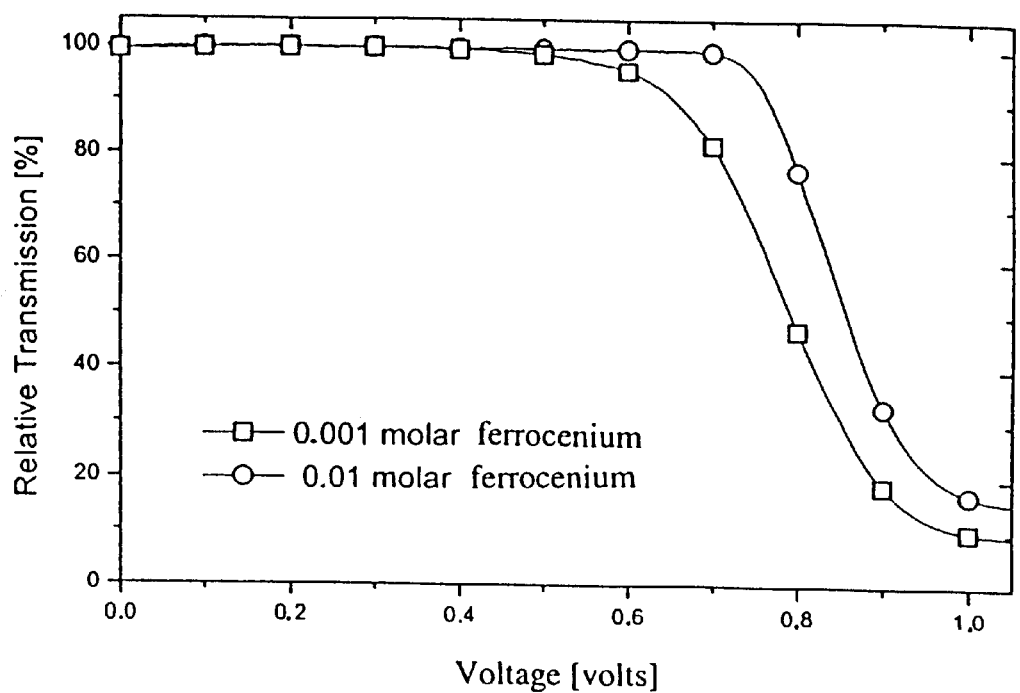
FIG. 2 shows an electro-optical characteristic line of two illustrative cells.
Figure 3:
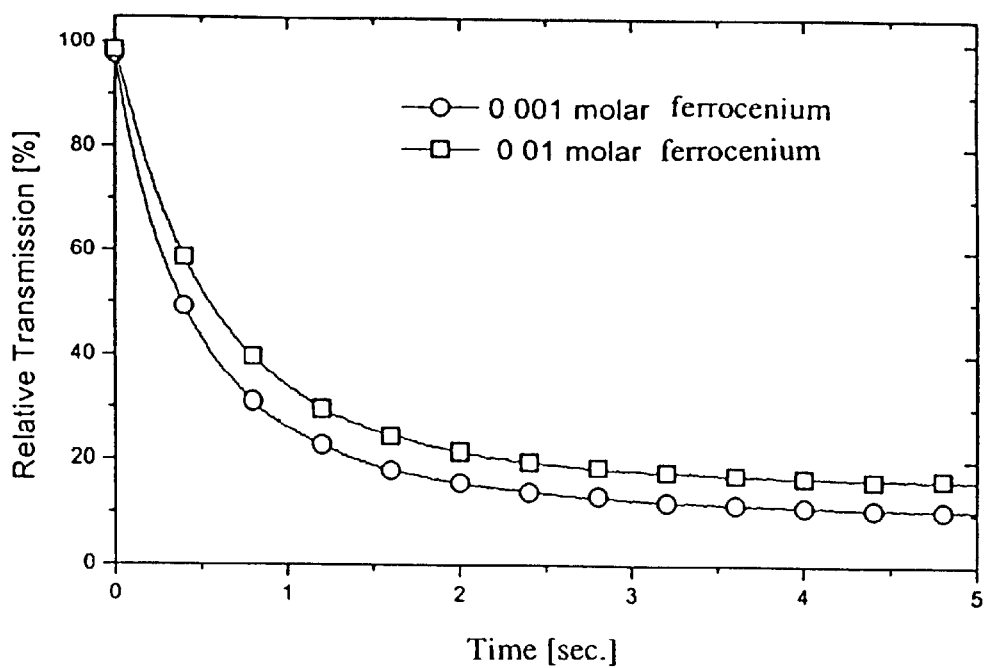
FIG. 3 shows switch-on characteristics of illustrative cells.

FIG. 2 shows an electro-optical characteristic line of two illustrative cells: relative transmission (ratio of the transmission at cell voltage U to the transmission at cell voltage 0) as a function of the cell voltage FIG. 3 shows switch-on characteristics of these illustrative cells: change in relative transmission with time after switchover of the cell voltage from 0 to 1 volt.

Figure 4:
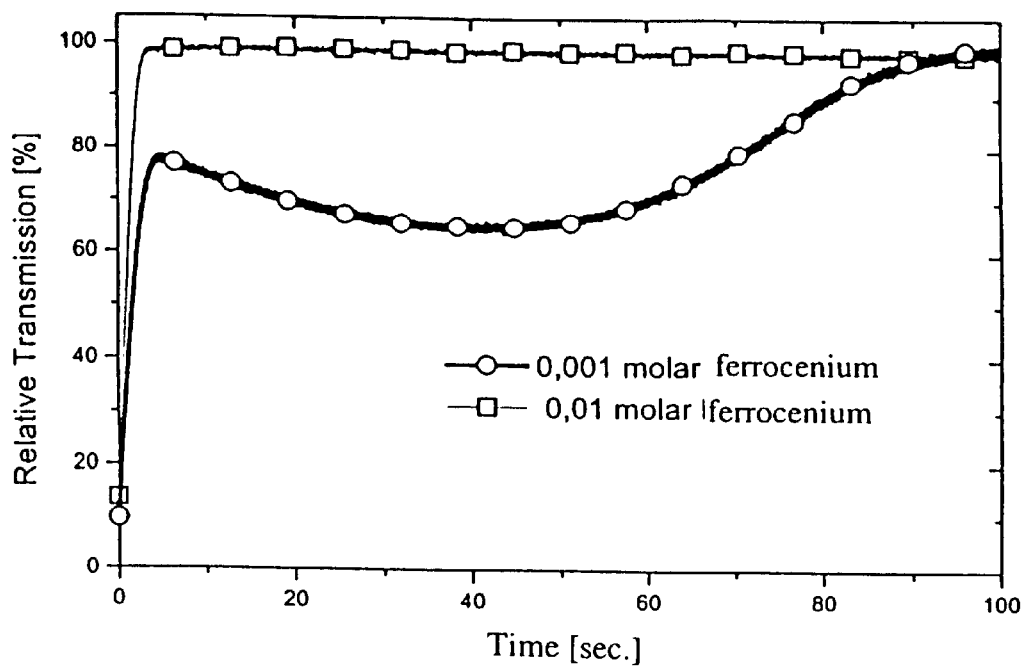
FIG. 4 shows switch-off characteristics of these illustrative cells.

FIG. 4 shows switch-off characteristics of these illustrative cells: change in the relative transmission with time after switchover of the cell voltage from 1 volt to 0.

The prior switched-on time (cell voltage 1 volt) was 60 seconds.

Figure 5:
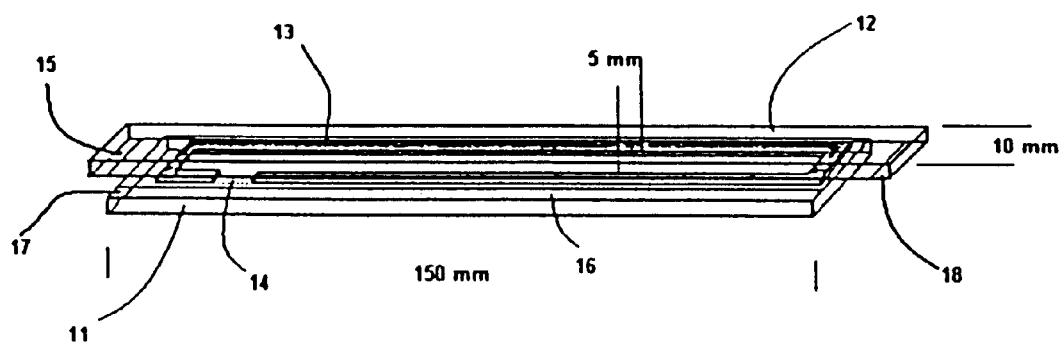
FIG. 5 shows a diagram of an electrochromic analogue display.

FIG. 5 shows a diagram of an electrochromic analogue display.

Figure 6:
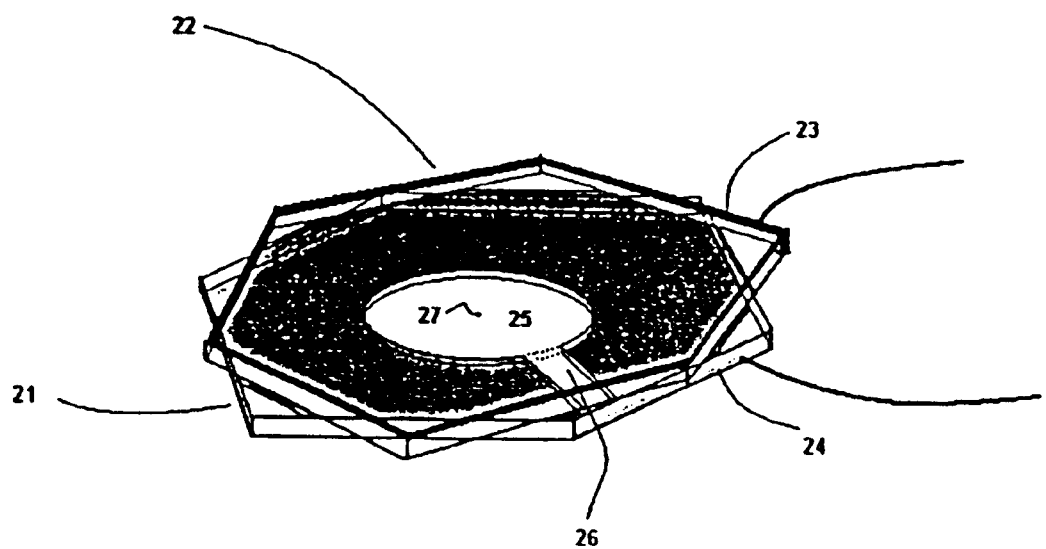
FIG. 6 shows a diagram of an electrochromic diaphragm.

FIG. 6 shows a diagram of an electrochromic diaphragm.

The invention is further described in the following illustrative examples in which all parts and percentages are by weight unless otherwise indicated.

Example 1

Display Device, Test Structure

An ITO-coated glass plate (50×45 mm$^2$) was provided on the ITO-coated side with a strip of adhesive tape (Tesapack 124 from Beiersdorf, Hamburg), which was about 7 mm in width and about 20 mm in length, from the edge of the shorter side of the glass plate into the interior. The glass plate prepared in this way was introduced into an aqueous bath containing 47.5% strength concentrated hydrochloric acid and 5% iron(III) chloride which had been heated to about 40° C. After 10 minutes, the glass plate was removed and rinsed with distilled water. In this way, a glass plate (1) which carried only a 20×7 mm$^2$ ITO strip (2) was obtained.

A mixture of 97% of photocuring epoxy adhesive DELO-Katiobond® 4594, DELO Industrieklebstoffe, Landsberg, and 3% of glass beads with a diameter of 100 μm was applied in the form of a ring (3) to the ITO-coated side of a second glass plate (4) (50×45 mm$^2$), with an aperture (5) being left open. The first glass plate (1) was then placed on the adhesive bead in such a way that the ITO layers of the two plates (1) and (4) were facing one another. The adhesive was cured by exposure for 10 minutes to daylight in the vicinity of a window and subsequently for 20 minutes at 105° C. without exposure. In this way, a cell as shown in FIG. 1 was obtained.

The cell was then placed vertically under a nitrogen atmosphere with the aperture (5) facing downward into a dish containing a solution which was 0.05 molar with respect to the electrochromic compound of the formula

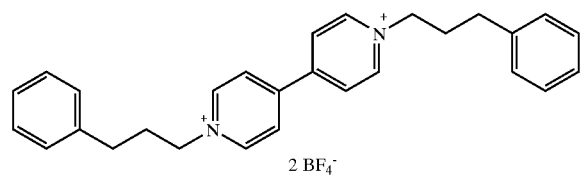

and 0.05 molar with respect to ferrocene of the formula

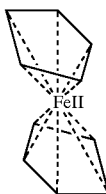

and 0.001 molar with respect to ferrocenium tetrafluoroborate of the formula

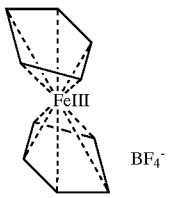

and finally 0.2 molar with respect to the UV absorber of the formula

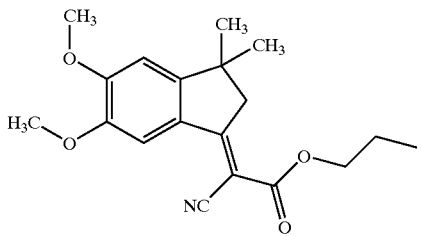

in anhydrous, oxygen-free propylene carbonate. The aperture (5) of the cell was situated beneath the liquid level in the dish. The dish with the cell was placed in a desiccator. This was evacuated to 0.05 mbar and then carefully aerated with nitrogen. During the aeration, the electrochromic solution rose into the cell and filled the entire volume apart from a small bubble. The cell was removed from the solution, cleaned at the aperture (5) under a nitrogen atmosphere by wiping with a paper cloth, and then sealed with the photo-curing epoxy adhesive DELO-Katiobond® 4594, DELO Industrieklebstoffe, Landsberg, thickened with 2% of silica gel aerosil. Finally, the cell was exposed to daylight in the vicinity of a window for 10 minutes and cured overnight at room temperature.

The cell produced in this way is referred to below as cell 1.

In addition, a second cell (cell 2) was produced in the same way as just described with the only difference that the electrochromic liquid was now 0.01 molar with respect to ferrocenium tetrafluoroborate instead of 0.001 molar.

The steady-state electro-optical characteristic line, e.g., the correlation between the cell voltage and the optical transmission which is established under steady-state conditions, of these two cells was measured using the display measuring system of the type DMS 301 from autronic-MELCHERS GmbH, Karlsruhe. The result of this measurement is shown in FIG. 2. The steepening of the electro-optical characteristic line with increasing content of ferrocenium is clearly evident, in particular in the region of low cell voltages. For example, the transmission of cell 1 has already dropped by 9.2% at a cell voltage of 0.65 volts, but only by 0.3% in the case of cell 2. This steepening of the electro-optical characteristic line is of great advantage for many industrial applications.

The optical switching characteristic, e.g., the change in optical transmission with time after a sudden change in the cell voltage from 0 volts to 1.05 volts (switch-on characteristics) or from 1.05 volts to 0 volts (switch-off characteristics), were likewise measured using the DM 301 display measuring system. After completion of the measurement of the switch-on characteristics, the measurement of the switch-off characteristics was begun immediately in one case. In the second case, after 60 seconds the switch-off characteristics were measured with a voltage of 1.05 volts still applied to the cell.

The measurement results shown in FIGS. 3 and 4 document the improved switching behavior of the electrochromic cell 2 due to the higher concentration of ferrocenium tetrafluoroborate. The switch-on characteristics change only little, indeed the cell becomes slightly slower with increasing ferrocenium content. However, it becomes significantly faster in switch-off behavior. The re-rise in the transmission by 50% of the original transmission increase takes place in 1.6 seconds in the case of cell 1, but in 0.8 seconds in the case of cell 2.

The effect of the ferrocenium is even clearer with regard to the so-called memory effect. This is taken to mean the change in switch-off characteristics with the time for which the cell was switched on before this measurement. At an only low ferrocenium content (cell 1), the cell initially dropped to a transmission value which was a good 20% below the initial value after a waiting time of 60 seconds at 1.05 V. This residual coloration then does not drop back completely until about 90 seconds. By contrast, cell 2 shows virtually no memory effect at a waiting time of 60 seconds.

A cell produced like cell 1, but containing no ferrocenium tetrafluoroborate, behaved virtually as cell 1 in all the properties outlined here.

Example 2

Analogue Display

A second glass plate (12) as described in Example 1 was stuck onto an ITO-coated glass plate (11) having a surface resistance of 15 Ω/square (see FIG. 5) using an adhesive bead (13) in such a way that a plate separation of 110 μm was produced and a fill aperture (14) remained.

As described in Example 1, the cell was filled with a solution which was 0.05 molar with respect to the electrochromic compound of the formula

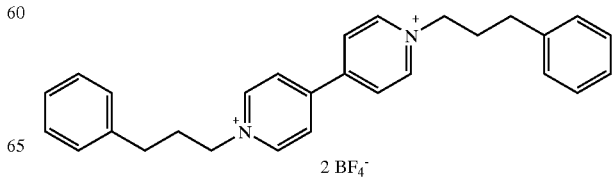

and 0.05 molar with respect to ferrocene of the formula

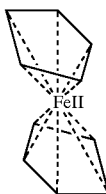

and 0.0175 molar with respect to ferrocenium tetrafluoroborate of the formula

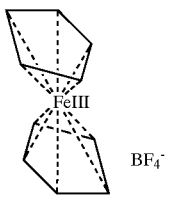

and sealed.

Cables (15) and (18) were soldered by means of conductive silver to the short edges of the plate (12). In plate (11), the long edge was completely coated with conductive silver (16), and the cable (17) was likewise soldered on.

The cell produced in this way is referred to below as cell 3.

In addition, a second cell (cell 4) was produced in the same way as just described with the only difference that the electrochromic liquid contained no ferrocenium tetratluoroborate.

Cell 3 was connected to a regulated voltage by means of the two cables (15) and (17), while cable (18) was connected directly to cable (17). The part of the cell facing the cable (15) changed color to blue, whereas the other part remained colorless. By changing the voltage in the range 0.7–3 V, the blue-colorless transition zone was shifted along the cell and thus served as a display of the applied voltage.

It was possible to operate cell 4 entirely analogously.

However, the two cells differed characteristically in the width of the blue-colorless transition zone. This was determined by measuring the transmission at 605 nm over the entire length of the cell. The region between 10 and 90% of maximum transmission change was defined as the transition zone. A width of 11 mm was obtained in the case of cell 3, and a width of 19 mm in the case of cell 4. Cell 3 containing the electrochromic solution according to the invention is thus superior, since a narrower transition zone enables greater display and read-off accuracy of the applied voltage.

If the cables (17) and (18) were not connected directly to one another, but instead via an adjustable resistance (0–500 Ω), it was possible to enlarge the region of the cell in which the transition zone could be shifted by varying the applied voltage.

Example 3

Diaphragm

Two hexagonal ITO-coated glass plates (21) and (22) (surface resistance 6.8 Ω/square) were provided on the uncoated side with a ring (23) and (24) respectively of conductive silver. This ring was connected in an electrically conductive manner to the ITO layer by means of conductive silver. Adhesive and spacers were applied to the ITO-coated side of plate (21) as described in Example 1 in such a way that a circular area (25) and a fill aperture (26) remained free in the center. A gold bead (27) having a diameter of 130 μm was placed in the center of the circular area (25). The plate (22) was placed on top by means of its ITO-coated side and pressed down, and the adhesive was cured as described in Example 1. In this way, a cell was obtained as shown in FIG. 6 with a layer separation of 110 μm.

This cell was filled with the solution from Example 2 as described in Example 2 and sealed. Finally, cables were soldered to the two rings (23) and (24) by means of conductive silver.

The cell produced in this way is referred to below as cell 5.

In addition, a second cell (cell 6) was produced in the same way as just described with the only difference that the electrochromic liquid contained no ferrocenium tetrafluoroborate.

By applying an adjustable voltage of 0.5–1.4 V to the two cables, the cells 5 and 6 changed color to blue in a ring shape, with the center remaining colorless. With increasing voltage, it was possible to reduce the size of the colorless center.

However, the two cells differed characteristically in the width of the blue-colorless transition zone. This was determined by measuring the transmission at 605 nm over the radius of the circular area (25) of the cell. The region between 10 and 90% of maximum transmission change was defined as the transition zone. A width of 0.7 mm was obtained in the case of cell 5, and a width of 1.3 mm in the case of cell 6. Cell 5 containing the electrochromic solution according to the invention is thus superior, since the narrower transmission zone enables greater depth of field in the picture in a camera.

Although the present invention has been described in detail with reference to certain preferred versions thereof, other variations are possible. Therefore, the spirit and scope of the appended claims should not be limited to the description of the versions contained therein.

What is claimed is:

1. An electrochromic device with improved switching behavior comprising:
    (a) a pair of glass plates, a pair of plastic plates, or a pair of plastic films,
    (b) an electrically conductive coating located on a side of at least one of the glass plates, the plastic plates, or the plastic films, wherein the pair of glass plates, plastic plates or plastic films are joined together via a sealing ring located on the side at which the electrically conductive coating is located and wherein the pair of glass plates, plastic plates, or plastic films and the sealing ring form a volume;
    (c) an electrochromic medium, contained in the volume, that comprises (i) a first reducible electrochromic compound $OX_2$, and a second reducible electrochromic compound $OX_3$ in an amount no greater than 30% of the concentration of $OX_2$, having a reduction potential the value of which is not greater than the value of the reduction potential of the first reducible electrochromic compound, and (ii) a first oxidizable compound $RED_1$ and a second oxidizable compound $RED_3$ in an amount no greater than 30% of the concentration of $RED_1$, having an oxidation potential the value of which is not greater than the value of the oxidation potential of the first oxidizable electrochromic compound;
    wherein at least one plate or at least one film and the conductive coating is transparent, and wherein the electrically conductive coating in at least one of the plastic plates, the glass plates, or the two films can be divided into separate, individually contacted area segments and the conductive coating can be connected at at least one point to an electrical conductor.

2. The electrochromic device according to claim 1, wherein the $OX_3$ compound is chemically and electrochemically identical to a compound $OX_1$ that corresponds to the first oxidizable compound $RED_1$.

3. The electrochromic device according to claim 1, wherein the second oxidizable compound, $RED_3$ is chemically and electrochemically identical to the $RED_2$ compound that corresponds to the first reducible compound $OX_2$.

4. The electrochromic device according to claim 1, wherein $OX_3$ compound and the $RED_3$ compound weakly absorb in the visible part of the electromagnetic spectrum.

5. The electrochromic device according to claim 1, wherein the device is a display device.

6. The electrochromic device according to claim 1, wherein the device is an analogue display device.

7. The electrochromic device according to claim 1, wherein the device is an adjustable diaphragm.

8. The electrochromic device according to claim 1, wherein the device is a contact sensor.

9. An electrochromic medium comprising at least one reducible electrochromic compound $OX_2$ and at least one oxidizable electrochromic compound $RED_1$, and also a further reducible or oxidizable electrochromic compound $OX_3$ or $RED_3$, respectively, in an amount no greater than 30% of the concentrations of $O_2$ or $RED_1$, and whose reduction or oxidation potential respectively has a value which is not greater than the reduction potential of $OX_2$ or the oxidation potential of $RED_1$.

* * * * *